US011399295B2

(12) United States Patent
Osinski et al.

(10) Patent No.: US 11,399,295 B2
(45) Date of Patent: Jul. 26, 2022

(54) PROACTIVE CUSTOMER CARE IN A COMMUNICATION SYSTEM

(71) Applicants: AT&T Intellectual Property I, L.P., Atlanta, GA (US); AT&T Mobility II LLC, Atlanta, GA (US); Purdue Research Foundation, West Lafayette, IN (US)

(72) Inventors: Matthew Osinski, Westfield, NJ (US); Jia Wang, Basking Ridge, NJ (US); Zihui Ge, Madison, NJ (US); Anthony Caracciolo, E. Brunswick, NJ (US); Chandra Thompson, College Park, GA (US); Benjamin Grizzle, Yukon, OK (US); Eric Bonitz, Pueblo, CO (US); Hendrik Hofman, Danville, CA (US); Sonia Fahmy, West Lafayette, IN (US); Chunyi Peng, West Lafayette, IN (US); Bruno Ribeiro, West Lafayette, IN (US); Amit Kumar Sheoran, West Lafayette, IN (US)

(73) Assignees: AT&T Intellectual Property I, L.P., Atlanta, GA (US); AT&T MOBILITY II LLC, Atlanta, GA (US); Purdue Research Foundation, West Lafayette, IN (US)

( * ) Notice: Subject to any disclaimer, the term of this patent is extended or adjusted under 35 U.S.C. 154(b) by 104 days.

(21) Appl. No.: 17/066,778

(22) Filed: Oct. 9, 2020

(65) Prior Publication Data
US 2022/0116793 A1    Apr. 14, 2022

(51) Int. Cl.
*H04W 24/02* (2009.01)
*H04W 8/18* (2009.01)
(Continued)

(52) U.S. Cl.
CPC ............ *H04W 24/02* (2013.01); *G06N 20/00* (2019.01); *G06Q 30/016* (2013.01);
(Continued)

(58) Field of Classification Search
CPC ................ H04M 15/00; H04M 17/00; H04M 2215/2026; H04M 2215/32;
(Continued)

(56) References Cited

U.S. PATENT DOCUMENTS

2014/0164256 A1* 6/2014 Booij .................. H04M 3/5231
705/304

OTHER PUBLICATIONS

Derakhshan, Roozbeh, Maria E. Orlowska, and Xue Li. "RFID data management: challenges and opportunities." 2007 IEEE International conference on RFID. IEEE, 2007. (Year: 2007).*

* cited by examiner

*Primary Examiner* — Sharad Rampuria
(74) *Attorney, Agent, or Firm* — John G. Rauch; Guntin & Gust, PLC

(57) ABSTRACT

Aspects of the subject disclosure may include, for example, automatically detecting a service issue of a telecommunication system that may impact a customer of a telecommunication service provider of the telecommunication system, predicting, by the processing system, a future customer care interaction by the customer as a result of the service issue, initiating a resolution action of the telecommunication system for the service issue before the customer contacts a customer care agent of the telecommunication service provider, wherein the initiating is responsive to the predicting the future customer care interaction and modifying a component of the telecommunication system to improve efficiency of operation of the telecommunication system by reducing a number of customer care contacts by customers (Continued)

of the telecommunication service provider. Other embodiments are disclosed.

20 Claims, 12 Drawing Sheets

(51) Int. Cl.
*H04M 3/42* (2006.01)
*G06N 20/00* (2019.01)
*H04M 3/51* (2006.01)
*G06Q 30/00* (2012.01)
*H04M 15/00* (2006.01)

(52) U.S. Cl.
CPC ....... *H04M 3/4217* (2013.01); *H04M 3/5175* (2013.01); *H04M 15/886* (2013.01); *H04W 8/18* (2013.01)

(58) Field of Classification Search
CPC ............. H04M 3/4217; H04M 3/5175; H04M 15/886; H04W 4/24; H04W 24/02; H04W 8/18; G06N 20/00; G06Q 30/016
See application file for complete search history.

(a) Distribution of daily care contacts (b) Time after which customers contact care.

(a) Reported issues in CL datasets (b) Observed issues in NL datasets

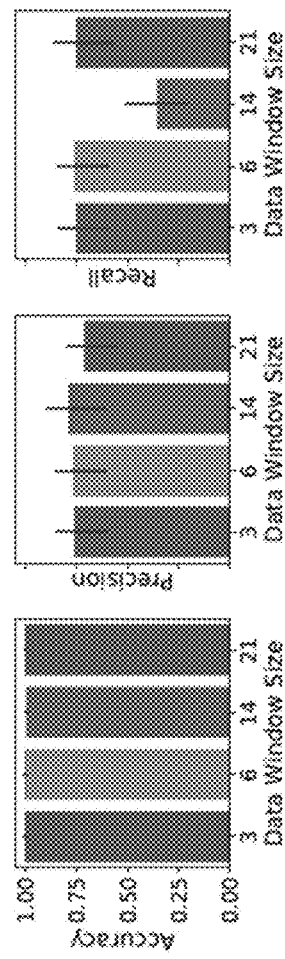
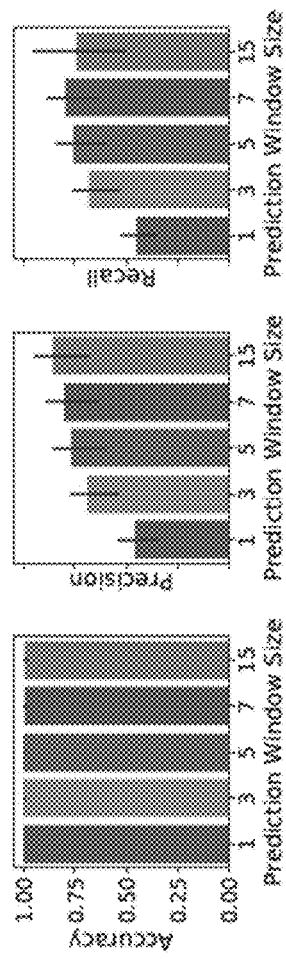
FIG. 2H
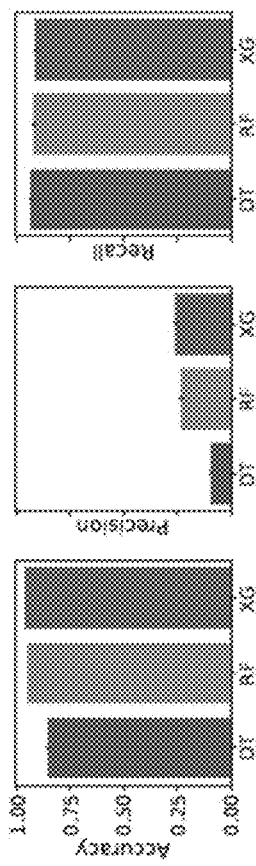
FIG. 2I (a) AFM  (b) IVM  (c) FBM (a) FBM results without bias $\beta$ for six UIDs for 7 consecutive days  (b) FBM feature importance scores (a) Customers which contacted care  (b) Mean voice/data failures per UID

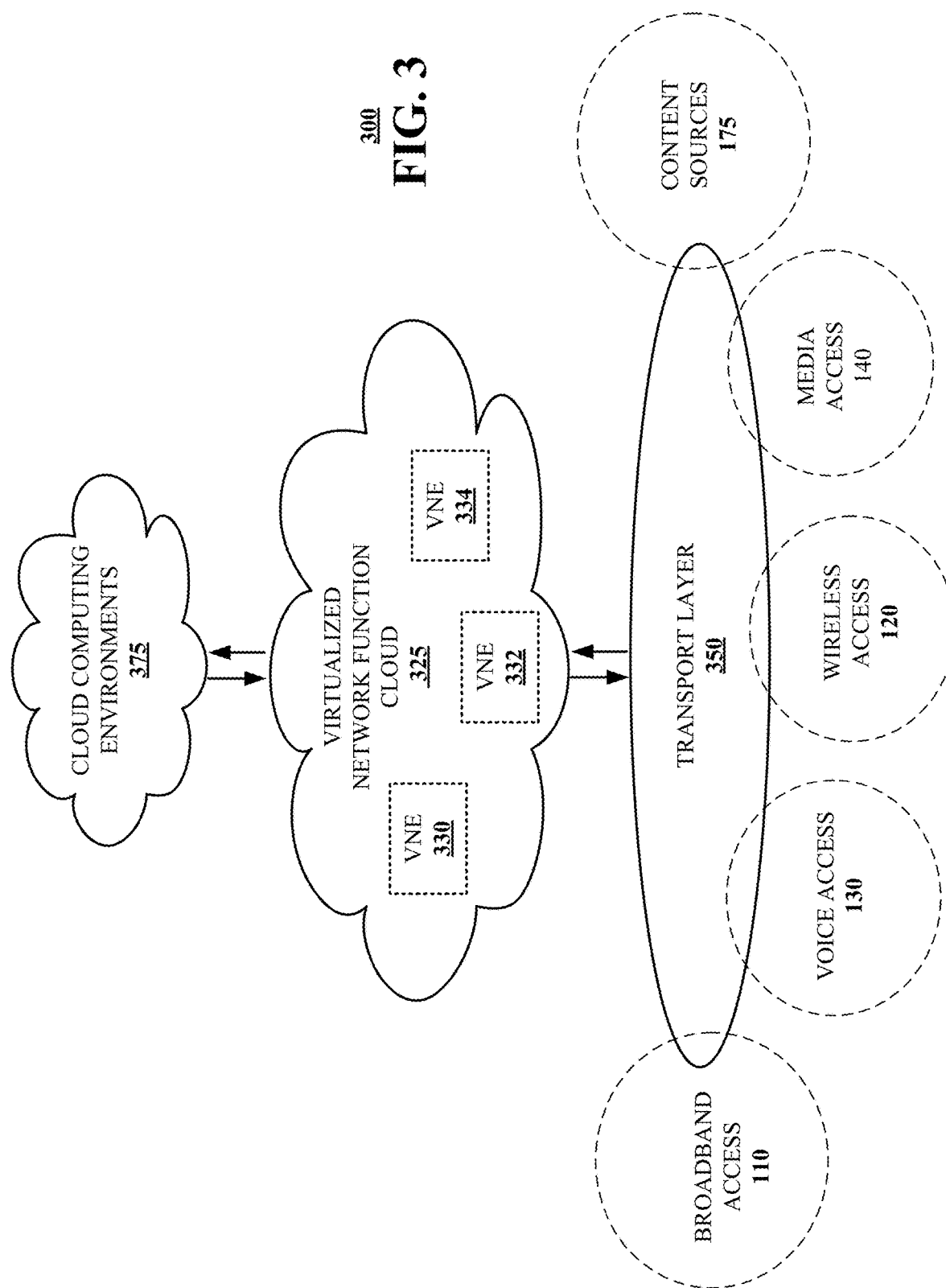

PROACTIVE CUSTOMER CARE IN A COMMUNICATION SYSTEM

GOVERNMENT LICENSE RIGHTS

This invention was made with government support under CNS-1717493, OAC1738981, CNS1750953, and CCF1918483 awarded by the National Science Foundation (NSF). The government has certain rights in the invention.

FIELD OF THE DISCLOSURE

The subject disclosure relates to proactive customer care in a communication system.

BACKGROUND

Communication system operators such as cellular service carriers are constantly pushing the boundaries to deliver a positive, meaningful and unique experience for each customer (user or subscriber). The vast majority of cellular network outages that impact customers at scale are proactively detected and resolved without waiting for customers to report them. However, service degradation caused by individual customer provisioning and device configuration errors still rely largely on customers to make the first move. To meet customer needs, an unprecedented number of traditional and digital channels have been made available, as customer support can be provided over the phone, through social media, and by online virtual assistants. While these omni-channel strategies have transformed how customer experience is managed, many of these strategies are largely reactive. Communication system operators tend to investigate and resolve these non-outage related individual customer service performance issues only after the customer initiates a trouble request

BRIEF DESCRIPTION OF THE DRAWINGS

Reference will now be made to the accompanying drawings, which are not necessarily drawn to scale, and wherein:

FIG. 2H illustrates impact of a sliding window and window size on results of the feedback model of FIG. 2G in accordance with various aspects described herein.

FIG. 2I illustrates a comparison of results for three different models in the feedback mode of FIG. 2G in accordance with various aspects described herein.

FIG. 3 is a block diagram illustrating an example, non-limiting embodiment of a virtualized communication network in accordance with various aspects described herein.

DETAILED DESCRIPTION

Figure 1:
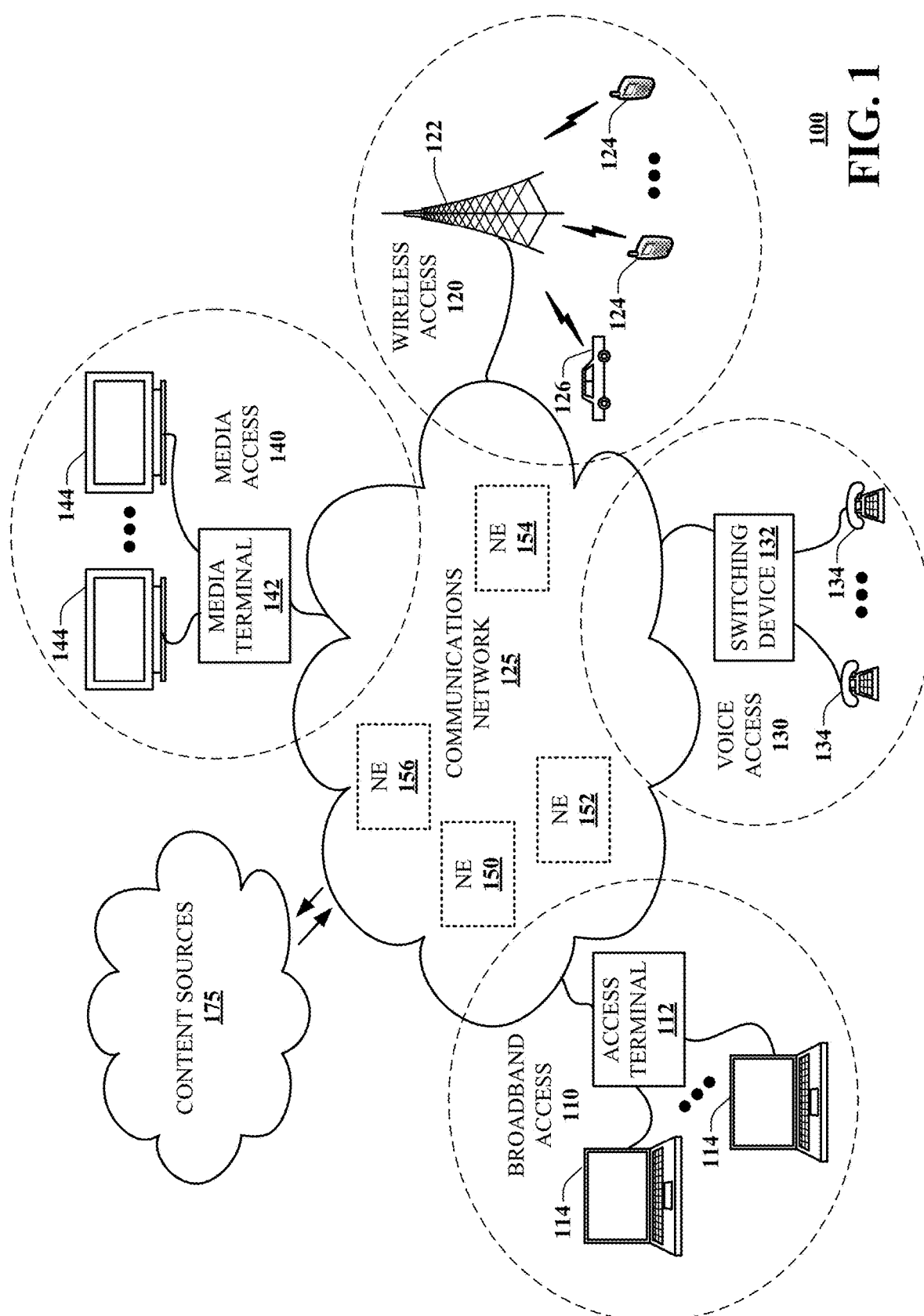
FIG. 1 is a block diagram illustrating an exemplary, non-limiting embodiment of a communications network in accordance with various aspects described herein.

The subject disclosure describes, among other things, illustrative embodiments for automatic resolution of customer issues in communication networks. Other embodiments are described in the subject disclosure.

Communication network operators such as cellular service carriers often utilize reactive strategies to assist customers who experience service degradation issues. That is, the operator or carrier receives from the customer a complaint or other indication about a failure in service and responds accordingly. A customer care operation of the operator (referred to herein as "care") identifies the nature of the complaint, determines a suitable resolution and implements a solution. This can require an undue amount of time to respond and create additional customer complaints about the response.

As an alternative and improved model, a novel, proactive strategy has been developed that monitors, troubleshoots and resolves device and service issues, without having to rely on customers to first generate complaints. The new strategy seeks to improve customer experience and care operation efficiency by automatically detecting individual service issues. Individual service issues are those that are non-outage related, such as when a portion of the communication network is not functioning properly. The new strategy further seeks to predict customers who are likely to contact care to report their issues, and proactively trigger actions to resolve these issues. Three machine-learning based prediction models are developed, and fully automated system is developed that integrates prediction models and takes resolution actions for individual customers. A trace driven evaluation is conducted based on real world data collected from a major cellular carrier in the US, and the novel strategy is demonstrated to be able to predict customers who are likely to contact care due to service issues with high accuracy. An embodiment is deployed into a cellular service provider network, for example. Other embodiments, such as broadband access networks, media access networks and voice access networks could be instantiated as well. Field trial results show that the strategy is effective in proactively resolving service issues, improving customer quality of experience (QoE), and reducing customer complaints.

One or more aspects of the subject disclosure include retrieving historical voice call information and historical data call information for a plurality of customers, including a selected customer, of a communication service provider, wherein the historical voice call information and historical data call information comprises information about network access by a plurality of customers to a communication network of the communication service provider, and training a machine learning model based on the historical voice call information and the historical data call information. Other aspects include applying current voice call information for the selected customer and current data call information for the selected customer to the machine learning model to determine a likelihood that the selected customer will require customer care assistance by the communication service provider, and responsive to the likelihood that the selected customer will require customer care assistance exceeding a predetermined threshold, initiating a corrective action on the communication network of the communication service provider to reduce the likelihood that the selected customer will require customer care assistance.

One or more aspects of the subject disclosure include receiving care log information and network log information about communications between a communication network of a communication service provider and a plurality of customers of the communication service provider, extracting feature vectors from the care log information and the network log information, and training a machine learning model using the feature vectors. Aspects may further include providing current call information to the machine learning model, wherein the providing current call information comprises providing information about current calls for a selected customer of the plurality of customers, wherein the information about current calls comprises current voice call information for the selected customer and current data call information for the selected customer for an analysis window, receiving, from the machine learning model, information about a likelihood that the selected customer will require customer care assistance by the communication service provider, and responsive to the likelihood that the selected customer will require customer care assistance exceeding a predetermined threshold, initiating a corrective action on the communication network of the communication service provider to reduce the likelihood that the selected customer will require customer care assistance.

One or more aspects of the subject disclosure include automatically detecting a service issue of a telecommunication system that may impact a customer of a telecommunication service provider of the telecommunication system, predicting, by the processing system, a future customer care interaction by the customer as a result of the service issue, initiating a resolution action of the telecommunication system for the service issue before the customer contacts a customer care agent of the telecommunication service provider, wherein the initiating is responsive to the predicting the future customer care interaction and modifying a component of the telecommunication system to improve efficiency of operation of the telecommunication system by reducing a number of customer care contacts by customers of the telecommunication service provider.

Referring now to FIG. 1, a block diagram is shown illustrating an example, non-limiting embodiment of a communications network 100 in accordance with various aspects described herein. For example, communications network 100 can facilitate in whole or in part collecting network log information about usage of all or a part of communications network 100 and care log information about customer interactions with customer care representatives about device and performance issues in the communications network 100, determining a likelihood that any one individual customer will contact customer care about an issue, and addressing the potential issue before the issue occurs and the individual customer contacts customer care. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
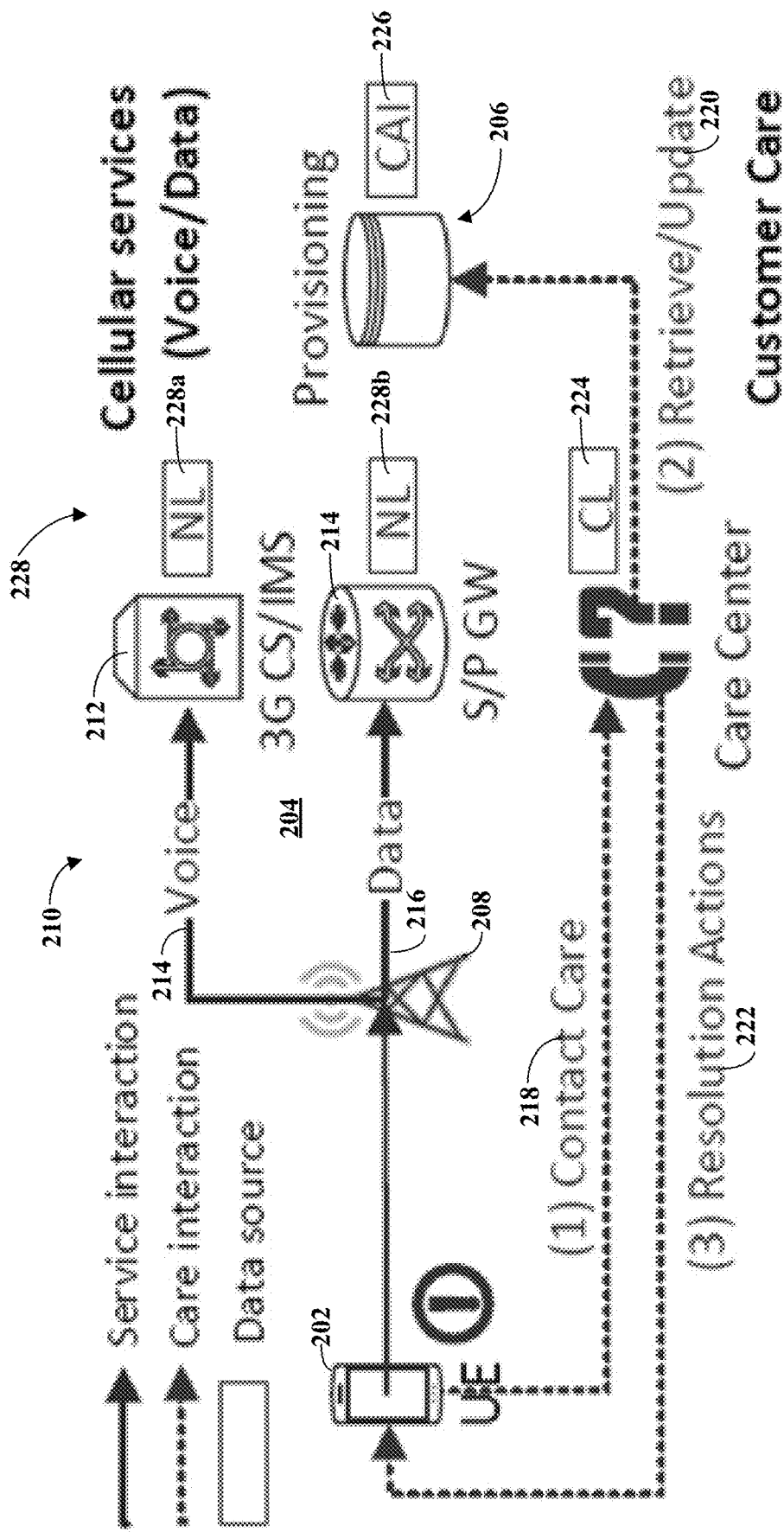
FIG. 2A is a block diagram illustrating an example, non-limiting embodiment of a system supporting basic communication services, as well as the typical work flow used to resolve customer issues, functioning within the communication network of FIG. 1 in accordance with various aspects described herein.

FIG. 2A is a block diagram illustrating an example, non-limiting embodiment of a system 200 supporting basic communication services, as well as the typical work flow used to resolve customer issues, functioning within the communication network of FIG. 1 in accordance with various aspects described herein. For example, communications network 125 may include embodiments of system 200 for providing access including wireless access 120 to a plurality of mobile devices such as user equipment (UE) 202. The mobile devices can be any type of devices including, for example, internet of things (IoT) devices. The system 200 includes infrastructure elements 204 and provisioning equipment 206. Embodiments of the system 200 may include, for example one or more radiotelephone systems such as cellular telephone systems. The infrastructure elements 204 include one or more base stations 208 and a core network 210.

Communication service providers such as wireless carriers and their customer care strategies heavily rely on reactive approaches to customer care. Such communication service providers typically provide customer access to various networks, including for voice calls and for data access, such as to the internet and facilities accessible over the internet. Customers typically access such networks using a device such as a mobile phone, a tablet, personal computer or other equipped with a communication interface and data processing components.

When trouble arises, customers conventionally have to take the first action and initiate a trouble report, such as via a care call, online chat, social media, etc., with the carrier in order for the carrier to being the troubleshooting and resolution process for individual wireless issues. The customer care technology in the wireless industry has been burdened heavily with costs and there has been a tremendous amount of investment to have customers shift from high cost channels, such as speaking with a care rep, to lower cost channels, such as using online forms, self-serve, frequently asked question pages (FAQ) and interactive voice response (IVR) systems. The software, system and algorithms in accordance with embodiments described herein offer wireless carriers the ability shift from reactive strategies to proactive strategies, and identify individual customers that are experiencing device or services issues and take resolutions actions, before the customer even notices there is an issue.

The disclosed system and method assists with detecting which customers are experiencing service issues and are likely to call into care. This is not trivial, as customers' behaviors vary across a wide variety of factors. For example, a customer can have a low tolerance for issues impacting voice calls, but have a high tolerance for data issues. Customers also are not experts on the network; wireless carriers do not have much visibility into the device. Care agents have to translate the customer's general complaint to a specific service issue via a questionnaire in order to identify what resolution actions to take. This current solution does not scale well, and may result in very inaccurate descriptions of issues which prolong the mean time to resolution. The disclosed system and method remove the need for this and can automatically map a customer's quality of experience to a network oriented quality of service metric, and then automatically take the appropriate resolution action.

Some wireless carriers have proactively sent short message service (SMS) messages to customers during large scale network outages in order to prevent customers from interacting with their customer care teams. However, this has not been accomplished for individual device issues. Wireline carriers employ such an SMS strategy and have also taken proactive actions on the customer's edge equipment, such as rebooting a WiFi router or gateway. However wireline carriers typically own the equipment and have much better telemetry from the customer's device, relative to the wireless industry.

In some aspects, the disclosed system and method analyzes historical records of customers that have interacted with care through multiple channels to obtain the quality of experience. The system and method then analyzes the customer's voice and data call detail records to identify the quality of service, and utilizes machine learning technologies to perform the correlation and determines the likelihood that a customer will call in. The system and method utilizes a novel feedback loop to recalibrate the probability for each customer over time in order to improve the accuracy of the predictions. The predications are generated nightly, for example, and are provided to a control loop which executives resolution actions on the individual devices determined to be most likely to call customer care.

The system and method in accordance with these embodiments provides substantial benefits. For example, the system and method in accordance with features described herein improves the quality of service for individual customers, and achieves a reduction in customer care calls, through the noted proactive approach. The system and method enable wireless carriers to fundamentally transform how wireless customer care is approached and can result in significant gains in operational efficiency, while also improving the customer's quality of experience. For example, through the noted proactive approach, the volume of network traffic required to identify and troubleshoot a particular customer's issues can be substantially reduced. The resolution of the issue can be invisible to the customer, initiated by the network remote from the customer before the customer even knows there is an issue.

Referring again to FIG. 2A, the system 200 may support several coexisting radio access network technologies. These technologies may incudes so-called second generation (2G), third generation (3G), fourth generation (4G) and fifth generation (5G) technologies, as well as those to be developed in the future. Each base station 208 establishes radio communication with user equipment such as UE 202 in an area served by the base station 208. Radio communication may be handed off from one base station to another in the case of mobile user equipment.

In one example, 3G and 4G radio access is offered by a base station 208 referred to as a NodeB and an e-NodeB, respectively. In the core network 210, in the case of 4G networks, data service 216 is provided by Serving/Packet Gateway, or S/PGW 214. Voice call service 215 is provided by voice-over-LTE, or VoLTE which traverse 4G NFs at IP Multimedia Subsystems (IMS) 212, or circuit-switched fallback (CSFB) that traverses the legacy 3G circuit-switched (CS) network. The infrastructure elements 204 form a set of cascading network functions (NFs). The infrastructure elements 204 permit communication of voice and data among respective network elements 204 and with other communications systems of communications network 125 (FIG. 1).

The provisioning equipment 206 permits control and supervision of the system 200. The provisioning equipment 206 may include one or more databases, servers and other data processing systems, switches and user interface devices to permit control and supervision of the system 200. In one example, the provisioning equipment 206 may include a Home Subscriber Server (HSS) storing information pertaining to the UE 202. In another example, the provisioning equipment 206 may permit detection of and response to customer care issues in which a customer or subscriber experiences device or service issues that require resolution.

Communication network operators such as cellular service carriers strive to provide a reliable, high-quality experience for each customer, including users or subscribers. However, to date, many customer care strategies have been largely reactive, relying on the customer to make the first move by initiating a complaint or other interaction. Carriers tend to investigate and resolve individual customer issues only after the customer initiates a trouble request.

To increase cellular service operation efficiency and to improve each individual customer's experience, embodiments of the system 200 shift from a reactive strategy to a proactive strategy when dealing with customer issues. Embodiments of the system 200 provide a novel, proactive framework that automatically detects service issues that impact customers' Quality of Experience (QoE) and predicts a future customer care interaction as a result of these service issues.

The system 200 further triggers resolution actions to remedy the detected issues before customers contact support agents. This not only improves customer QoE by minimizing the impact of service issues, but also increases operation efficiency of cellular service providers by reducing the number of customer care contacts and the subsequent investigation and mitigation process.

Solutions described herein focus on technical issues, meaning issues involving user equipment (UE) and service related issues, that impact individual customer QoE. Other customer issues such as cellular service plan upgrades and billing events may be beyond the scope of the system 20. The discussion begins with a deeper understanding of these technical issues reported by customers, and utilizes machine learning techniques to identify network and service performance degradation signatures that lead customers to contact customer support or customer service (referred to as "care" herein). Solutions described herein operate to correlate network logs and customer care logs to automatically take resolution actions for individual customers.

The discussion herein addresses the following questions: (1) What types of device and network issues are likely to cause service performance degradation that impacts customer QoE in cellular services? (2) What types of service performance degradation are likely to drive customers to contact care and report their issues? (3) Which actions should be invoked on customer devices and network servers to resolve customer issues? (4) How effective are proactive resolution actions in terms of improving customer QoE and increasing service provider operation efficiency?

The problem of identifying which individual customers are impacted by service issues may be complicated by a number of factors. First, while available data sources are massive, some data sources do not have the granularity or latency desired to compose a complete picture of individual service issues across the end-to-end service path. Second, not all customers report service troubles. Only a small fraction of customers contact customer care to report service failures. Furthermore, not all customers report technical issues at the moment they occur and instead may wait a period of time that is highly variable. Third, the service issues that customers report to care can be ambiguous or inaccurate. The issue types recorded by customer care agents can be highly subjective, and it may be difficult to attribute them to specific root causes. Expanded service offerings, new devices on the market, and multiple resolution actions exacerbate the problem.

One or more of the following are addressed: (1) An automated framework to identify individual customers experiencing service degradation due to technical issues, and resolve their issues by proactively invoking resolution actions, is described. (2) Data sources available to cellular service providers to understand customer behavior are analyzed. (3) Novel machine learning-based models are developed to predict individual customers who are likely to contact care due to non-outage related service issues using a combination of customer-perceived and network-observed metrics. (4) A trace driven evaluation of the proposed framework is conducted based on large scale real world data collected from a major cellular service provider. (5) An embodiment of the framework is deployed into the major cellular service provider network as a field trial. Field trial results show that the framework is effective in proactively resolving non-outage related service issues, improving customer QoE, and reducing customer complaints.

Issues that impact a specific user's session across the control plane or user plane of a communication network may occur anywhere across the network topology, and are captured via network fault and performance management techniques. Even with this information, customer care organizations employ reactive strategies when dealing with individual customers. That is, customers usually have to initiate a trouble report to generate an investigation.

Referring again to FIG. 2A, the bottom portion of the drawing shows a typical customer care investigation flow. The flow in this example includes three steps. In a first step 218, the customer contacts the care center operated by the network operator or service provider and is directed through an automated interactive voice response system to an appropriate first-tier team. In general, the first-tier team includes human personnel operating in conjunction with network equipment, such as the provisioning equipment 206.

In a second step 220, the first-tier team performs a number of routine troubleshooting and resolution actions. Such actions may include checking customer account and billing status, service provisioning status, known outages and hardware/software issues. Generally, the actions are organized based on the issue type reported by the customer. Example issue types include billing, administration, technical, for example. If the issue is not easily diagnosed and resolved, the issue reported by the customer may be escalated to the second-tier technical team for further investigation of network and service logs, along with performing additional resolution actions in a third step 222. The second-tier team generally also includes human personnel operating in conjunction with network components. The second-tier team may have specialized knowledge or experience that is of particular value.

In the third step 222, resolution actions are taken to solve the problem reported by the customer. In general, all actions are automatically recorded during this process. The customer care agent who is responsible for this customer-reported issue also provides a written summary, including the troubleshooting steps or resolution actions, taken and their results.

Customer care agents may handle a large variety of issues, which are manually classified into a very large number of categories. Customer care issues are roughly divided into two categories: technical issues and non-technical issues. A technical issue means that it is likely a result of technical or configuration issues in the network or a device operating on the network. Some examples of technical issues include, "Unable to make/receive voice calls," "Unable to connect to data services," "Cellular Data Connectivity," and so on. Non-technical issues are related to routine customer engagement or information inquiries, such as inquiries about new services or plans, service activation or deactivation, billing-related inquires and device setup. In general, technical issues are relatively more difficult to resolve and heavily impact customer QoE. Accordingly, particular attention is paid to the automated resolution of technical issue.

To improve responsiveness and reliability, the conventional reactive strategy is replaced with a proactive strategy that automatically detects and resolves issues in order to reduce the resolution time and improve customer QoE. The system and method in accordance with this strategy detect performance degradation issues faced by a customer through leveraging network, service, and customer care logs collected by the network operator or cellular service provider.

As illustrated in FIG. 2A, there are available several data sources which include data collected and aggregated from existing networking interfaces. The main data sources used in this example can be summarized as follows.

A first data source includes care logs (CL) 224. Care logs 224 record interactions between customers and care agents. Each respective care log of the care logs 224 generally includes (1) user identification information, or UID of the customer associated with the respective care log, (2) timestamp indicating date and time associated with the respective care log, (3) care contact channel including online chats, phone calls, and store walk-ins associated with the respective care log, (4) issue type, which is manually provided by the interacting care agents and is associated with the respective care log, (5) description of the issue associated with the respective care log, which may be in free text format added by the customer care agent, and (6) sequence of actions taken for troubleshooting and resolution of customer issues. Conventionally, the care logs 224 are collected after obtaining customers' permission.

A second data source includes customer account information (CAI) 226. Customer account information 226 contains information regarding the customer service subscription. Examples include a user identifier, which may be anonymized, the device manufacture and model of the UE 202 of the customer, information about a hardware and software version, an activation time, and information about a last update to the account of the customer.

A third data source includes network logs (NL) 228. The network logs 228 contain information about how a customer device such as UE 202 uses each data service and voice service over the network. In some examples, the network logs 228 consist of two datasets. These network logs 228 include voice call records (VCR) 228a. Voice call records 228a record information for each respective voice call. Data is collected, for example, by the IMS for VoLTE calls, and by the 3G CS network elements such as IMS 212 for CSFB calls, for example. Table 1 lists exemplary main attributes of voice call records 228a. Typically, the voice call records 228a dataset covers both successful voice calls and call failures. In case of call failures, additional information may be recorded to capture the status and cause of record closing.

In addition to the voice call records 228a, the network logs 228 may include data connection records (DCR) 228b. The data connection records 228b contain information for each data service. The data connection records 228b are collected from the S/PGW 214 for each packet data network connectivity (PDN) session and may be organized by its Access Point Name (APN), for example. Table 2 lists exemplary main attributes of the data connection records 228b. In some examples, in case of packet-switched (PS) calls (VoLTE), a predesignated APN may be used to tunnel a voice call from the PDN network to IMS, and the sessions are recorded in the DCR 228b dataset. If a data session fails, the cause of termination is recorded as a CFT code in the DCR 228b.

TABLE 1

Attributes in the VCR dataset.

| Attribute | Description |
| --- | --- |
| UID | User identifier (anonymized) |
| Start Time | Time the when Charging Collection Function (CCF) started session |
| End Time | Time when the CCF terminated session |
| Cause for Record Closing | Reason for the release of the session. (0) for successful sessions |
| Status (if applicable) | Abnormal status information of the session. SIP (4XX/5XX) code (Blocked/Dropped) |

TABLE 2

Attributes in the DCR dataset.

| Attribute | Description |
| --- | --- |
| UID | User identifier (anonymized) |
| Start Time | Time when the PDN session starts |
| End Time | Time when the PDN session ends |
| CFT Code | Cause for termination (CFT) for a PDN session |
| APN ID | APN name of failed PDN session |

It should be noted that all the datasets may be indexed according to an anonymized user identifier (UID), which is different from the unique, permanent customer identifier such as an International Mobile Subscriber Identity (IMSI) or phone number, to protect customer privacy. The anonymization is conducted in a consistent way such that each anonymized UID uniquely identifies a mobile customer, without revealing any personal identification information.

The current approach to automating customer issue resolution applies machine learning techniques to proactively identify customers who are experiencing a degraded QoE, and to predict if they will contact care in the near future. This problem can be modeled as a classification problem using the features extracted from datasets collected by the service provider. If a customer is predicted to call care, the system and method take action to resolve the issue, which will reduce the severity and duration of customer QoE degradation, and eliminate the need for the customer to contact care.

While determining if a customer is experiencing service quality degradation sounds simple, there are several technical challenges that are inherent in the datasets used in the study. These are discussed below.

Data scale and quality. The datasets described above were collected from a major cellular service provider operating in the United States over several months. Developing models that generate actionable results for individual customers requires data sources that provide UE granular information with a low to medium latency.

Furthermore, an analysis of the network logs 228 datasets (VCR 228a and DCR 228b) for failures requires significant computational resources due to the massive volume of the network logs 228 datasets. In one example, the network logs 228 data includes over 100 billion entries per day.

Not all candidate data sources meet these requirements, which limit the ability to capture the metrics from the end-to-end service path of customers' cellular service. For example, as shown in FIG. 2A, complete data is not available from the radio layer interfaces, such as the e-NodeB, where many failures occur but are not visible from the core network 210. To gain a better understanding on this data limitation, the care logs 224 dataset and network logs 228 dataset were correlated, and the percentage of customer-reported issues in the care logs 224 dataset was computed that can be observed from the network logs 228 dataset. It was found that less than 25% of reported issues can be observed in the network logs 228 dataset, and it is believed that the primary cause of this limitation is due to the incompleteness of available datasets.

Behavioral aspects in issue reporting. By correlating the care logs 224 dataset and the network logs 228 datasets, it was found that only a very small percentage (0.3%) of customers who experience some kind of service degradation, such as a voice call drop, contact care. In addition, customers who experience performance-related issues do not necessarily have a higher probability of contacting care and reporting their issues. Reviewing data about the percentage of voice calls made by customers during a time period of two weeks and the percentage of voice call failures experienced by them, it was observed empirically that a large percentage of customers who call care experience few voice call failures. A similar pattern was seen when comparing the percentage of data sessions initiated by customers and the percentage of data connectivity failure events experienced by the customers. It was found that customers who contacted care do not encounter a large number of data connectivity failures; in fact, a large number of customers who contact care encounter few (if any) data connectivity failures. These observations imply that threshold-based prediction models cannot reliably be used to predict customer behavior.

Figure 2B:
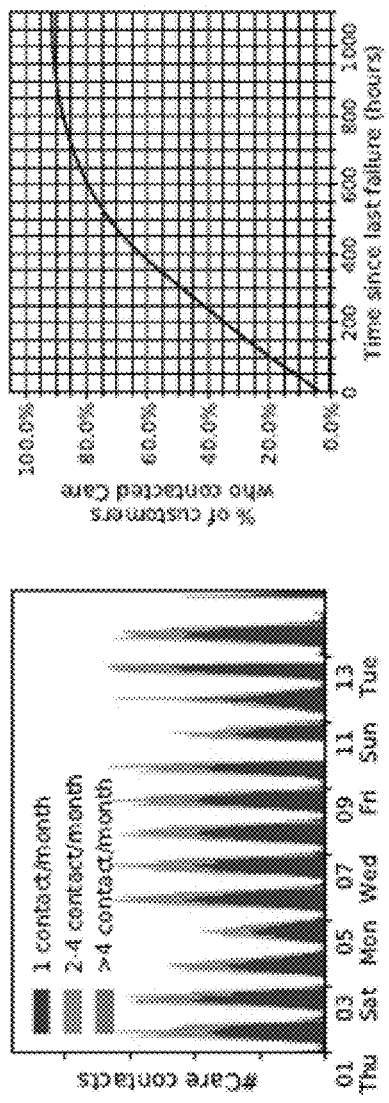
FIG. 2B illustrates an exemplary number of care contacts for technical issues received per hour for a two-week period and an exemplary distribution of the time difference between the last observed failure event in the network logs datasets and the time when the customer contacts care to report technical issues in the system of FIG. 2A.

In addition, differing customer attitudes may impact when and how often a customer contacts care. FIG. 2B illustrates an exemplary number of care contacts for technical issues received per hour for a two-week period and an exemplary distribution of the time difference between the last observed failure event in the network logs 228 datasets and the time when the customer contacts care to report technical issues in the system of FIG. 2A. Referring to FIG. 2B(a), this figures shows the number of care contacts for technical issues received per hour for a two-week period. The y-axis scale is omitted due to preserve data confidentiality. As seen from FIG. 2B(a), care contact volume is often higher on Mondays and Tuesdays, whereas weekends typically have the lowest volume of care contacts. Nearly 25% of care contacts are received from customers who have contacted care more than once a month. Nearly 3% of care contacts are received from customers who have contacted care at least 4 times a month.

FIG. 2B(b) shows the distribution of the time difference between the last observed failure event in the network logs 228 datasets and the time when the customer contacts care to report technical issues. It was found that, among all customers who contact care, only 18% of customers contact care within 24 hours of experiencing an issue, and 27% of customers contact care after two days of experiencing an issue. The duration after which a customer calls care depends on when the performance issue is encountered (e.g., the day of the week and time of day) and the failure patterns or signatures. In addition, different customers likely have different tolerance levels to performance degradation. For example, most customers may choose to ignore temporary performance degradation unless the issue is persistent or chronic, while some individual customers tend to contact care every time they spot a performance degradation. Predicting customers who are likely to contact care due to technical issues therefore requires understanding the relation between network-observed metrics such as Quality of Service (QoS) and customer-perceived QoE. Since QoE is affected by individual customer behavior and attitude, developing models tailored to improve individual customer experience is a challenging task.

Issue classification and resolution fidelity. When a customer does report a service issue, the issue types recorded can be highly subjective and sometime ambiguous. While service degradation can occur across the end-to-end service path between the UE 202 and the core network 210 (FIG. 2A), individual customers are seldom aware of the root causes. Given the complexity of the network, along with emerging technologies and changes in the device ecosystem, the actual categories of errors reported to care by customers are very broad. For example, some of the most commonly reported issues include "Unable to make voice Call" and "Unable to connect to internet."

Figure 2C:
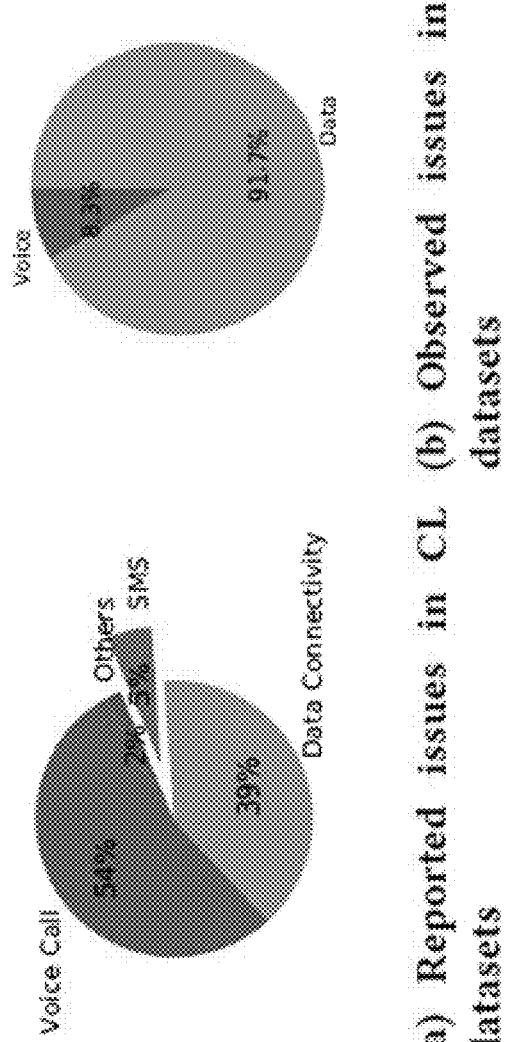
FIG. 2C illustrates exemplary types of issues that customers reported to care in an exemplary system over a sample 30-day period and percentage of data session failures among all the service issues observed from network logs in the system of FIG. 2A.

FIG. 2C illustrates exemplary types of issues that customers reported to care in an exemplary system and percentage of data session failures among all the service issues observed from network logs in the system of FIG. 2A. FIG. 2C(a) is a pie chart showing types of issues that customers reported to care over an exemplary 30-day period. It was observed that voice call and data connectivity issues constitute approximately 93% of technical issues reported to care. While 54% of customers report voice call-related issues to care, voice calls contribute only 1.7% percent of the total cellular traffic (voice plus data traffic). FIG. 2C(b) is a pie chart showing that among all the service issues observed from network logs 228, 91.7% are data session failures. Customers are much less concerned about, or aware of data connectivity issues, compared to voice call issues.

Figure 2D:
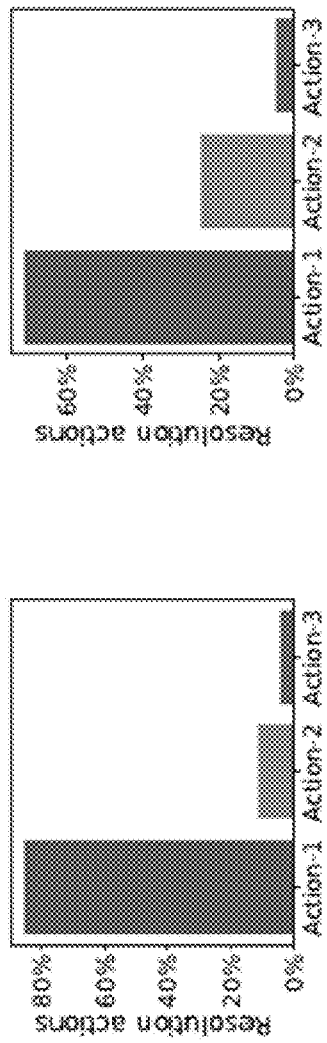
FIG. 2D illustrates an exemplary distribution of three resolution actions taken by care agents to resolve customer care issues in the system of FIG. 2A.

In general, human care agents are trained to follow a pre-defined protocol during their interactions with customers. Due to the subjectivity and ambiguity of issues reported by customers, there may be inconsistency in diagnosis and resolution actions performed by such human care agents. FIG. 2D illustrates resolution actions taken by care agents to resolve customer care issues in the system of FIG. 2A. FIG.

2D(a) is a bar chart showing an exemplary distribution of three resolution actions taken by care agents to resolve issues in the category "Cannot Make or Receive Calls." FIG. 2D(b) is a bar chart showing an exemplary distribution of three resolution actions to resolve issues in the category "Cellular Data Connectivity." While the specific resolution action name are omitted for confidentiality, these resolution actions include in one example triggering a network initiated detach procedure, forcing the customer device to re-initiate the radio connection, and flushing authentication vectors from the Home Subscriber Server (HSS).

Correlating network events to customer QoE. The network logs 228 datasets may contain information about many events and alerts. There are several reasons why it may be difficult to map these events and alerts to a degraded customer QoE. First, the end-to-end service path of a cellular service request usually contains multiple network elements involved in processing cellular traffic. The following insights may be used to select features used in the design of a prediction model. First, most customers only experience either voice or data connectivity failures, but not both. Second, customers have lower tolerance for voice call failures and therefore customers experiencing a higher number of voice call failures are more likely to report issues to care. Third, customers who make a large number of voice calls are more likely to contact care and report issues. Therefore, it may be concluded that customers who make a large number of voice calls and experience a greater number of failure events (QoS) are more likely to contact care, which results in a higher percentage of voice call-related issues (QoE) reported to care. A model to predict customer care contact behavior should thus focus on customers who (a) make a high number of voice calls and (b) experience a higher number of voice call failures.

Design Guidelines. The network logs 228 dataset includes several attributes that are not useful in predicting user behavior, such as error codes and network elements, some of which may be external to the cellular carrier network. Example external elements include elements involved in processing cellular traffic. The following insights may be used to select features used in the design of a prediction model. First, most customers only experience either voice or data connectivity failures, but not both. Second, customers have lower tolerance for voice call failures and therefore customers experiencing a higher number of voice call failures are more likely to report issues to care. Third, customers who make a large number of voice calls are more likely to contact care and report issues. Therefore, it may be concluded that customers who make a large number of voice calls and experience a greater number of failure events (QoS) are more likely to contact care, which results in a higher percentage of voice call-related issues (QoE) reported to care. A model to predict customer care contact behavior should thus focus on customers who (a) make a high number of voice calls and experience a higher number of voice call failures.

Figure 2G:
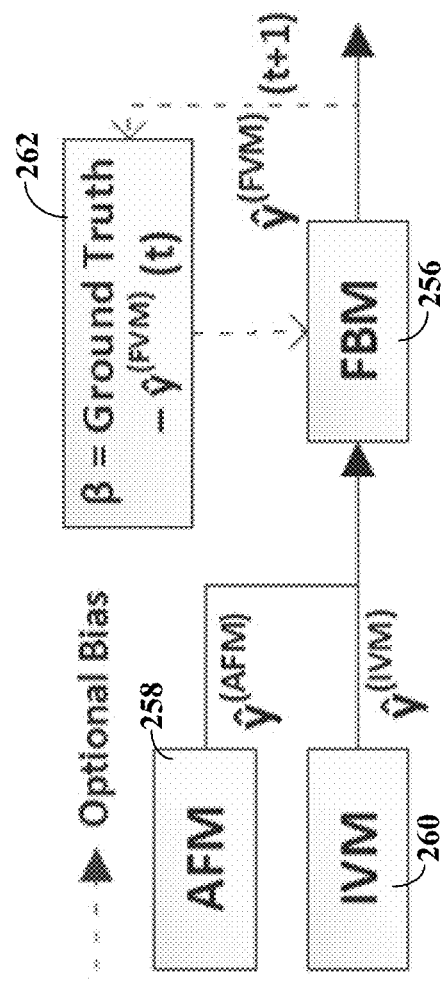
FIG. 2G illustrates the feedback loop of the feedback model in accordance with various aspects described herein.
Figure 2E:
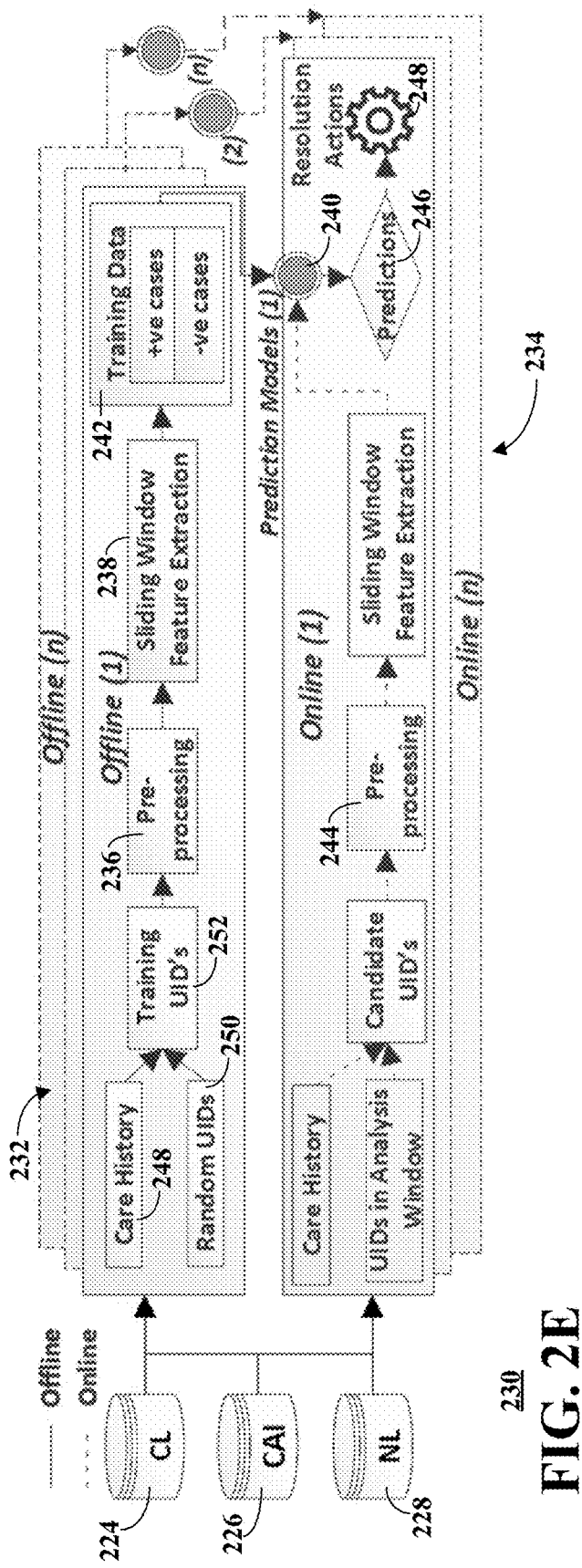
FIG. 2E illustrates a framework design for proactive customer care in accordance with various aspects described herein.

FIG. 2E illustrates a system 230 for proactive customer care in accordance with various aspects described herein. The system 230 is a framework for automated monitoring, detection, and resolution of customer issues related to service performance degradation. As depicted in FIG. 2E, the system 230 includes two phases: (1) an offline phase 232 in which historical data is used to train prediction models, and (2) an online phase 234 in which the predictions made by the models are used as triggers to take resolution actions to repair issues impacting individual customer devices.

As will be described in more detail below, the offline phase 232 consists of three steps or operations or processes. First, the three input datasets (CL 224, CAI 226 and NL 228) are preprocessed in a preprocessing operation 236. One goal of this data preprocessing is to remove data related to devices or conditions that are out of scope of this study. Second, a feature extraction module 238 is applied on each input dataset. Third, machine learning model or prediction model 240 are trained in a training dataset 242 for predicting customers who are likely to contact care and report service issues based on the extracted features.

In the online phase 234, the prediction model 240 takes real-time network logs 228 as input, performs a preprocessing operation 244, detects failure signatures, and a predictions 246 predicts the customers who are likely to contact care due to service issues. In a resolution action 249, resolution actions are then triggered to resolve these issues. Service performance metrics are monitored before and after the actions to assess the impact of resolution actions.

It may be noted here that components of the system 230 can be deployed in any suitable location, or at a plurality of locations. For example, components that perform the functionality of the system 230 can be located in either centralized or distributed fashions. In some embodiments, system 230 must analyze a very substantial volume of data. For example, the system may need to process, for every subscriber or customer, that customer's network logs including call records and information about how that customer accesses the communication network. In some embodiments, components that implement the functionality of FIG. 2E, including offline training and online processing, can be implemented at a single centralized location. That provides a benefit in that all data for all customers is centrally located and available for processing by the system 230. A downside to the centralized implementation is the requirement to move all customer data to that centralized location, where customers and network equipment are very decentralized and spread over a possibly very large geographic area. That can require substantial time to push data from various data centers and convey the data to the centralized location.

In an alternative embodiment, the offline phase 232 and the online phase 234 of the system 230 can be deployed independently in separate geographical locations in some embodiments. This is indicated by the indices Offline(1) ... Offline(n) and Online(1) ... Online(n). In one example, n=11 and eleven data centers are used for processing customer data. The model of the system 230 can be deployed at any number of data centers, such as data centers which are physically closer to selected customers and the data that the customers generate. One benefit of such a distributed system is faster accumulation of customer data in a data center, faster operation of the model and a faster prediction produced by the model of the system 230. Customer data can be broken up or organized or arranged according to any useful criteria, such as by geographical range (all customers in New Jersey, for example), by user equipment (all cell phones produced by Apple Inc.) or others.

In the offline phase 232, training or testing sets are created based on information from the care logs 224, the customer account information 226 and the network logs 228. In one embodiment, two training and testing sets are formed. A first training set 248 is formed by identifying all UIDs that have contacted care during a specified test period. Suitable test period durations may be, for example, 6 days, 25 days, one month or six months. A second training set 250 is formed randomly sampling UIDs from the network logs 228 dataset.

The first training set 248 and the second training set 250 are combined to form a set of training user identifiers (UIDs) 252. The set of training UIDs 252 form the input to the preprocessing operation 236.

The preprocessing operation 236 preprocess datasets including the set of training UIDs 252 to filter out data in the three exemplary cases. First, the preprocessing operation 236 removes data records that are collected during the time period when there were known data quality issues, such as e.g., missing data, bogus data. Suspect data can have undesirable impact on the prediction model. Automatically and systematically cleaning data has always been a challenge and is itself an open research problem. In one embodiment, the preprocessing operation 236 uses a rule-based mechanism to identify and remove suspect data based on domain knowledge.

Second, the preprocessing operation 236 filters out all the data records related to known network outages in both the care log 224 dataset and network log 228 dataset. Individual service degradations which are not attributed to network faults in some examples account for 95% of customer reported issues in exemplary data sets, and are a much harder problem to diagnose and resolve at scale, when compared to service degradation stemming from network outages. The system 230 focuses on the non-outage related service degradation issues that impact customer QoE, such as, for example, device misconfiguration, provisioning errors, device software/hardware issues.

Third, the preprocessing operation 236 discards all roaming mobile devices from the network log 228 datasets. A customer mobile device is defined to be a roaming device if the customer is not an authenticated customer based on the customer account information 226 data and the system 230 is not able to conduct any resolution actions on these devices.

The feature extraction module 238 generates usable feature vectors from raw data. In the illustrated embodiment, there are two types of data sources: (a) static data sources such as the customer account information 226 for which the information can only be changed by a network operator such as cellular Operations and Management (OAM), and (b) dynamic data sources such as the care logs 224 and network logs 228 which change as customers use services or contact care.

Table 3 shows exemplary static feature vectors extracted by the feature extraction module 238 from the customer account information 226 dataset for each unique device. The feature extraction module 238 in one embodiment uses one-shot-encoding to convert descriptive features such as "Device Information" to binary values such as "True" or "False." Similarly, the dynamic records in the care logs 224 dataset and the network logs 228 dataset may not be directly usable as features. The feature vector extraction module 238 calculates key performance metrics such as, for example, usage and failure, using a fixed time bin as dynamic feature vectors as listed in Table 4. Examples of the time duration for the fixed time bin are one day or one hour. Other time durations may be used.

TABLE 3

Static Feature Vectors per UID

| Feature | Description |
| --- | --- |
| Activation-Time | Account activation timestamp |
| device-type-apple | True/False |
| device-type-others | True/False |

TABLE 4

Dynamic Feature Vectors per UID

| Feature | Description |
| --- | --- |
| # Blocked-Calls | Number of calls blocked |
| # Dropped-Calls | Number of calls dropped |
| # Calls | Number of calls made |
| # Call Duration | Duration of calls made |
| # Data-Session (F) | Number of failed data sessions |
| # Data-Sessions (S) | Number of successful data sessions |
| # Care-calls (T) | Number of technical care contacts |
| # Care-calls (O) | Number of other care contacts |

In some instances, straightforward feature extraction may have some limitations. These may include the following. A first limitation is the potential existence of imbalanced classes for training. It is known that only a small fraction of customers experience service issues, and only a small fraction of these customers contact care. This represents an imbalance in class size for training a model. Such an imbalance is typically solved either by under-sampling the majority class in a mini-batch or re-weighting its loss. However, in the current example, availability of fewer samples of the minority class, or customers who contacted care, will require accumulating training data over a longer duration for a statistically significant balanced training sample. A second limitation is seasonality within data. Customer care centers experience higher call volumes on certain days of the week, as illustrated in FIG. 2B(a). A third limitation includes temporal dependencies among the data. Once a customer contacts care, the same customer is unlikely to contact care if the issue is resolved. In addition, customers are unlikely to contact care on consecutive days, as collected data show lapse of at least 24 hours after experiencing service issues, as illustrated in FIG. 2B(b). It is insufficient to simply use previous day data.

To account for behavioral aspects of care contact, maximize utilization of samples of customers who contact care, and exploit care contact seasonality, the feature extraction module 238 in the illustrated embodiment uses a sliding window design to create the training dataset or test dataset for the prediction models 240. The sliding window design, in effect, re-starts the clock when a customer calls in to care. Such calls have a seasonality to them, as illustrated by FIG. 2B(a). More calls are observed to occur on certain days of the week, for example. For example, according to FIG. 2B(a), evidence indicates that more calls are received by care on Wednesday, Thursday and Friday in a given week than on Monday. In some embodiments, if a customer calls care, the system 230 looks back from 1 to 25 days to see what that customer's call history has been. Using a sliding window, the day of the week on which the customer contacts care becomes less important. The sliding window operates to normalize customer care information.

Figure 2F:
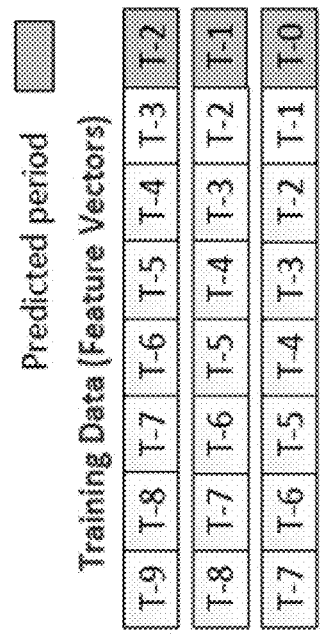
FIG. 2F illustrates an exemplary sliding window design for feature vectors in accordance with various aspects described herein.

FIG. 2F illustrates an exemplary sliding window design for feature vectors in accordance with various aspects described herein. FIG. 2F shows how features are aggregated to create the training dataset or test dataset using a sliding window of 7 time units, W={T-7, T-6, T-5, T-4, T-3, T-2, T-1}. In the illustrated example, T corresponds to one day, T=0 is the day on which the customer calls care, T=−1 is the day prior, etc. The use of single day time windows may be appropriate for an aggregated system using a single system 230 and model for a large or nationwide prediction program. For smaller, distributed systems, which have respectively less customer data to process, shorter time windows such as one hour may be appropriate. The sliding window design provides information about what the customer's performance has been, such as whether the customer blocked more calls than usual on the day corresponding to T=0 or whether the customer experienced more dropped calls than usual.

As shown in FIG. 2F, using inputs of 10 time units (T-9 to T-0), the feature extraction module 238 creates three slices of data, slice-1 using data from T-9 to T-3 using which predictions for T-2 are generated; slice-2, using data from T-8 to T-2, using which predictions for T-1 are generated; and slice-3, using data from T-7 to T-1, using which predictions for T-0 are generated. Predictions are based on a set of rules about likelihood that a customer will call care, such as whether the user device uses the Android operating system or the iOS operating system, or whether the user make a relatively large number of voice calls. The rule set may be modified or adjusted over time or to reflect information learned about customers and users of the communication network.

This sliding window design allows the feature extraction module 238 of the offline phase 232 to (a) maximize the utilization of positive samples (shortcoming (1) above), because data for each time unit is used in multiple slices (n times with an n-unit sliding window), and (b) handle seasonality and temporal dependencies (shortcomings (2) and (3) above): The feature extraction module 238 uses care contacts made by a customer per time unit as an additional input to the models. To address shortcoming (4) above (unpredictable reporting time), a different time window is used by the online phase 234 for predicting if a customer is likely to contact care, e.g., it is predicted if a customer is likely to contact care in the next |R| time units as a result of service issues, setting |R|={T−0, T+1, T+2, T+3, t+4}. The sliding window parameters |W| and |R| should be carefully selected to meet operational requirements. The values of the sliding window parameters |W| and |R| are discussed in more detail below.

Let U be the stochastic process that generates data $U_i = U_{i,1}, \ldots U_{i,n}$), which are the records of the i-th user from a starting time t0=1 until an end time tend=n, where n>|W|+ |R| is assumed constant. Let N>0 be the number of users in the care logs 224 and the network logs 228. Then $\{U_i\}_{i=1}^{N}$ is the data used to construct the training dataset 242. In the training dataset 242, positive cases correspond to times when a customer did call care. Negative cases correspond to when a customer did not call care. This may be considered to be the target variable. The model uses a machine learning algorithm to determine a probability that, given a customer and given that there is 25 or 60 days, for example, of call log history for the customer, what is the probability that the customer will call care today? For the customers that are predicted to call care, the operator of the system can take a mitigation action to eliminate the need for the call by the customer, before the need arises. Again, this is done on an individual customer basis.

The training dataset 242 may be an aggregate of the care logs 224, the customer account information 226 and the network logs 228. The network logs 228 include information generated by customer care team members when a customer calls into care. This may include the customer's phone number, the time of the call, what actions were done on the customer's device, the nature of the customer's reported problem, such as a billing issue or a network issue. The customer account information 226 may include static features on the customer's account such as the customer's device make and model, how long the customer has had the account. The network logs 228 may include a combination of call detail records with information about who was called, when a call was made, if a call failed including if the call was dropped or blocked. Call failure information can be indicative of a customer more likely to complain, because of an increase in number of calls that were blocked or dropped. The preprocessing operation 236 operates in part to combine the information from the care logs 224, the customer account information 226 and the network logs 228. In the aggregate, this may be a very large amount of data, from all or nearly all subscribers or customers in a network.

The sliding window feature extraction operates to normalize the pre-processed data. The effect will be that, when a customer calls care for assistance, at day T=0, the system 230 can look back a set number of days, such as 60 days, to see what the customer's service has been like on the network. This can include identifying blocked or dropped call, difficulty accessing the internet, etc. Customers that have higher numbers of failed calls are more likely to call in and complain. The combination of care logs 224, the customer account information 226 and the network logs 228, for each respective customer, may be considered that customer's service signature. The service signature may include additional data or less data, depending on what information is available for a particular customer.

The machine learning algorithm implemented by the system, including prediction model 240, uses the service signature of a particular customer to try to find other customers that have similar signatures and draw conclusions about the likelihood of the particular customer to call care. For example, if the customer's signature has a high number of blocked calls, similar to other customers in the training data, and the other similar customers had a high incidence of calling care, then the probability that the customer will call care may be relatively high, as well. That suggests that that customer is one who should get attention to resolve technical issues before the customer is prompted to call care. Other factors may be determined to be important for determining the probability of likelihood to call, such as the nature of the customer's device (Android device versus iOS device) may show a likelihood to call, customers that have more voice calls in a week may be likely to call care. The prediction model 240 may implement a series of rules based on empirical data or based on an analysis of past history. The rules may be updated as the history develops over time. For example, as network topography changes as the network is built out, more or fewer calls to care may arise. As new devices are introduced to the market, they may cause new care issues. Similarly as old devices or old models of devices, fade from use, the relative number of calls to care may decline. The prediction model 240 may be dynamically updated from time to time to account for such changes.

The historical data from the care logs 224, the customer account information 226 and the network logs 228 are used to train the prediction model 240. From time to time, such as daily, the system 230 retrieves current network data including the care logs 224, the customer account information 226 and the network logs 228, such as for the most recent day. This retrieved data is used as test data for the prediction model. The test data may be supplemented with other data that may be available, or modified in any suitable way. The test data is applied to the prediction model 240 and, in one embodiment, the prediction model produces a list of telephone numbers that have a relatively high probability of calling into care as predictions 246. The telephone numbers produced by the prediction model 240 serve as identifiers for customers that may call care. Any other suitable customer identifier may be used and produced as predictions 246 output by the prediction model 240.

The list of telephone numbers, or other identifying information, are then used to take resolution actions 249 by the system 230. Resolution actions 249 may include any suitable activity which may obviate a call to care by the customer associated with the identifying information. Examples of such resolution actions 249 include, for example, one or more of the following:

Cancel Registration: Cancel/detach the UE's Serving GPRS Support Node (SGSN) and Mobility Management Entity (MME) registration to the Evolved Packet Core Home Subscriber Server (EPC HSS).

Resend Subscriber Activation: obtain the customer's latest subscriber profile in the billing system and update the Home Subscriber Server Home Location Register (HSS/HLR) with it.

Resend Over-The-air activation profile: resend the current services/features to the Subscriber Identify Module (SIM) card & activate the SIM if it is inactive.

Push a remote software upgrade: notifies devices (Android operating system only) to upgrade to latest firmware.

Other resolution actions may be implemented. The possible resolution actions 249 listed here are advantageous in being generally invisible to the customer and occurring very quickly. Such network-based actions generally occur in the background and the customer may see only a brief delay. However, the noted resolution actions are generally highly effective for improving quality of a customer's service and the reliability of the customer's device interacting with the network. In effect, the machine learning algorithm of the system 230 helps identify who are the most vulnerable customers, most likely to experience an issue. The resolution actions 249 the prophylactically takes action to reduce likelihood of the problem occurring.

The training dataset 242 $D_{train}$ is constructed through sliding windows of length $|W|+|R|$ over as depicted in FIG. 2F. More specifically, the training dataset 242 may be considered as $D_{train}=\{((X_i, Z_i)\}_i$, where $X_i \in R^{|W| \times p_{stat}}$ is a matrix with pstat-dimensional static features of each time unit in W, $Z_i \in R^{|W| \times p_{dyn}}$ is a matrix with pdyn-dimensional dynamic features of each time unit in W, and $Y_i \in \{0,1\}^{|R|}$ is a random variable vector containing the target label (whether or not someone will contact the call center at each of the next $I_{RI}$ time units in the future).

Now define a function (feature generator) $\Phi$: $R^{|W| \times p_{dyn}} \rightarrow R^{|W| \times p_{dyn}}$ that takes $Z_i$ of user i as input and outputs a set of features in the same space. The feature extraction module 238 then learns a classifier f that takes this feature matrix $\Phi(Z_i)$ and Xi and outputs $\hat{y} \in [0,1]^{|R|}$, and estimate of the probability $$P((Y_i)_d=1|W_i,Z_i) \approx (\hat{y}_i)_d = f(\Phi(Z_i), X_i)_d \quad (1)$$

that user i will contact care and report an issue at the d-the time unit of a window of size $|R|$, i=1, ..., N. The output of a machine learning model is the likelihood that a particular customer will call customer care for assistance or with a complaint.

A straightforward approach for solving the problem described here is to build a binary classification model based on a combination of static and dynamic feature vectors. However, this simple binary classification may not work well in some instances due to the challenges discussed above, such as data scale and quality, behavioral aspects of users reporting service degradation, issue classification and fidelity of reporting, and the correlating of network events to customer quality of experience. Different feature vector generation functions $\Phi$ from Equation 1 may be designed to address these challenges.

A first model to be considered is an aggregated feature model (AFM). AFM uses a combination of features extracted from (a) Static features in customer account information 226 as shown in Table 3, i.e., X, and (b) aggregated dynamic feature vectors extracted from the network logs 228 dataset and care logs 224 dataset, Table 4, i.e., Z. AFM defines the $\Phi_{AFM}$ of Equation 1 as the identity function, i.e., $\Phi_{AFM}(a)=a$ which yields $$\hat{y}_i^{(AFM)} = f(\Phi_{AFM}(Z_i), X_i), \quad (2)$$

where $\hat{y}_i^{(AFM)}$ is the classifier described in Equation (1).

Feature importance scores generated by XGBoost were analyzed for the AFM. XGBoost is an optimized gradient boosting library available at xgboost.readthedocs.io/en/latest, for example. The top five features in decreasing order of feature importance scores are: Activation-Time, Call-Duration {T-1,T-2,T-3}, #Calls {T-1,T-2,T-3}, #Failed-Calls {T-1,T-2,T-3}, #Data-Sessions {T-1,T-2}. In case of dynamic features where each feature consists of $|W|$ entries (one entry corresponding to each time unit in W), the value in the parenthesis { } shows the prefix of the time unit which had the highest feature importance score (sorted in decreasing order). The feature importance scores of AFM are consistent with the observations reported above. The AFM model is very effective at identifying customers likely to call customer care, but may be over-inclusive, identifying too many customers with a likelihood to call. For example, if a threshold of 5 failed calls per month is established, for some customers with relatively poor network coverage, 5 failed calls per month is routine whereas for customers with excellent network coverage, 5 failed calls per month is an extreme, anomalous situation likely to provoke a call to customer care.

A second model to be considered is an Individual Variations Model (IVM). IVM is designed to leverage variations in individual usage/failure patterns. The IVM model is helpful to remove anomalous conditions and to help normalize the customer's experience on the network. As an example, consider a customer (in a low coverage area) who experiences an average of n voice call failures/day. While this customer may not contact care if they continue to experience similar failures ratio per day, they are likely to contact care when the number of failures exceeds the average daily failures. The IVM model is designed to detect such variations in individual usage. The IVM model takes into account the customer's mean usage. This may include, for example, the customer's mean number of voice calls the customer makes, the mean number of blocked calls the customer experiences, or the mean number of failed calls, in a predetermined period such as one month. If the number of failed calls, for example, exceeds the mean number of calls for a period, the system 230 will identify and respond to the condition.

The static features used by the IVM model are the same as the AFM model, since there are no variations in the customer account information 226 dataset. Dynamic features of the IVM are created by subtracting the actual values in a given time unit from the mean value of the same feature, where the mean value of a feature is calculated using all instances of a given feature in the entire data D. The dynamic features used by IVM can be described as $$\Phi_{IVM}(Z_i) = (\bar{z}_i - Z_i, \ldots, \bar{z}_i - Z_i), \quad (3)$$

where $\bar{z}_i$ is a vector whose m-th component is the row-average (time average) of feature (column) m in matrix $Z_i$.

The output of the classifier in Equation 1, using the features created by $\Phi_{IVM}$, is then $$\hat{y}_i^{(IVM)} = f(\Phi_{IVM}(Z_i), X_i). \quad (4)$$

The feature importance score of IVM is similar to that of AFM discussed above.

A third model to be considered is a feedback model (FBM). Obtaining a model with low false positives is one challenge in developing a framework for automated proactive customer issue resolution. Under some circumstances, both AFM and IVM have relatively low precision and therefore may result in high false positives. Thus, while overall model accuracy is important, minimizing false positives may also be critical in reducing unnecessary actions and any unwanted impacts on network and customer devices. An ensemble model may therefore be developed that uses the inputs from AFM and IVM to minimize the prediction errors in the system 230. The FBM receives the probabilities from both the AFM and the IFM and adds in a bias variable. β. The bias variable β in effect tracks performance over time for each customer, relative to whether or not the customer called care. The bias variable fits a constant variable for each customer. It serves as a normalized behavior for each customer's behavior. The bias variable β serves to help the model fit the data better.

FIG. 2G illustrates an embodiment of the feedback model 256 in accordance with various aspects described herein. The feedback model 256 uses as inputs information from the aggregated feature model 258 and the individual variations model 260. Further, the feedback model 256 may optionally receive bias information from bias module 262.

The feedback model 256 uses the probability values generated by AFM and IVM, i.e., $\hat{y}_i^{(AFM)}$ and $\hat{y}_i^{(IVM)}$ from Equation 2 and Equation 4, respectively, as inputs along with a bias variable. Recall from FIG. 2F that the prediction window W slides by one unit each time a prediction is made. Therefore, using the input set {T-9 to T-1} defined in FIG. 2F, there are three rounds of predictions each using slice-1, slice-2, and slice-3. Let t denote a round, which includes generating a set of predictions using slice-1 and moving the sliding window to slice-2. Given t, the output of the classifier function g is $$\hat{y}_i^{(FMB)}(t) = g(\hat{y}_i^{(AFM)}(t), \hat{y}_i^{(IVM)}(t), \hat{\beta}_i(t-1)), \quad (5)$$

where $\hat{\beta}_t(t-1)$ is a bias given by $$\hat{\beta}_i(t) = \hat{y}_i^{(FBM)}(t-1) - y_i(t-1),$$

where $\hat{y}_i^{(FBM)}(t-1)$ is the expected result from the classifier and $y_i(t-1)$ is the observed $Y_i(t)$ at time t-1 of user i=1, ..., N. The difference between $\hat{y}_i^{(FBM)}(t-1)$ and $y_i(t-1)$ corresponds to whether a person called care, or not, compared with whether they were expected to call care. That is, for each round t, the bias parameter $\hat{\beta}_i(t)$ stores the difference between the actual label $Y_i(t)$ [0|1] and estimated probability $\hat{y}_i^{(FBM)}(t)$, which is then passed as optional bias when the predictions for round t+1 are made. In some applications, the bias variable allows the actual data to better fit the derived machine learning model. In other applications, no bias variable may be required, and in yet other applications, other bias variables may be used or developed based on particular empirical data. The next section demonstrates the impact of bias parameter β on the performance of the feedback model.

The output of the feedback model 256 is a value between 0 and 1 corresponding to the probability that a particular customer is likely to call care. Before a resolution action is called or implemented, the output probability may be compared with a threshold. Probability values exceeding the threshold will be dealt with through some appropriate resolution action. The threshold may be set using any useful criteria, such as 0.7

Experimental Evaluation

A prototype of the system 230 was developed using open source libraries. In one embodiment, the system executes on a Hadoop cluster with 45 TB memory and 9000 virtual cores. The system may be implemented using Apache Pig scripts to clean and join customer records from data located in both a Hadoop Distributed File System (HDFS) data lake and relational databases. The feature generators and classification models may also be developed in Apache Spark, using XGBoost ensemble libraries. Other implementational equipment may be readily supplemented as well.

Evaluation methodology. Trace-driven emulations were conducted based on historical data to evaluate the performance of the system 230. Datasets (i.e., customer account information 226, call logs 224, and network logs 228) were adapted from data of a large cellular service provider that include two independent sample sets of data collected from June to December 2019. The training dataset contains over 500K customer devices (UIDs) and the testing dataset contains over 800K customer devices (UIDs). As shown in FIG. 2E, training and testing datasets are created by identifying all UIDs that have contacted care during the test period, in first training set 248, and by randomly sampling the UIDs from the network logs 228 dataset to form the second training set 250.

Standard statistical metrics of accuracy, precision, and recall, may be computed using True Positives (TPs), True Negatives (TNs), False Positives (FPs) and False Negatives (FNs). Models may also be evaluated in terms of the Area under receiver operating characteristic curve (AUROC). AUROC is a more robust measure of classification performance as it integrates the prediction accuracy with all possible thresholds.

Justification of design choices. First, as discussed above, the proposed models use data for the last |W| time units to make predictions for the next |R| time units. Therefore, the values of |W| and |R| should be carefully selected to balance data processing overhead, desired accuracy, and cellular provider requirements. The impact of |W| and |R| were evaluated on the performance of all three models (AFM, IVM, and FBM). For brevity, the results of the AFM and IVM are omitted and only analyze the results of the FBM model. It was found that using days as the time unit works well, and a time unit of days is therefore used for evaluation herein. Other time units may be substituted. FIG. 2I(a) shows that |W|=6 yields high accuracy and precision. While higher values of |W| increase precision, the processing overhead outweighs the performance benefits. FIG. 2I(b) shows that |R|=7 outperforms other values. Therefore |W|=6 and |R|=7 are used for further analysis. Other values may be used in other embodiments.

Second, Decision Trees (DTs), Boosted Decision Trees (XGBoost), and Random Forests (RFs) are compared. Neural networks (NN) results are not easy to interpret, which is a key requirement for the system 230, so neural networks are not used. FIG. 2I presents the results using the identity feature generator function Φ(a)=a. It is observed that XGBoost outperforms both DT and RF in accuracy and precision. DT and RF yield relatively low precision, owing to the challenges discussed above. Therefore, XGBoost is chosen for further use in this example.

Figure 2J:
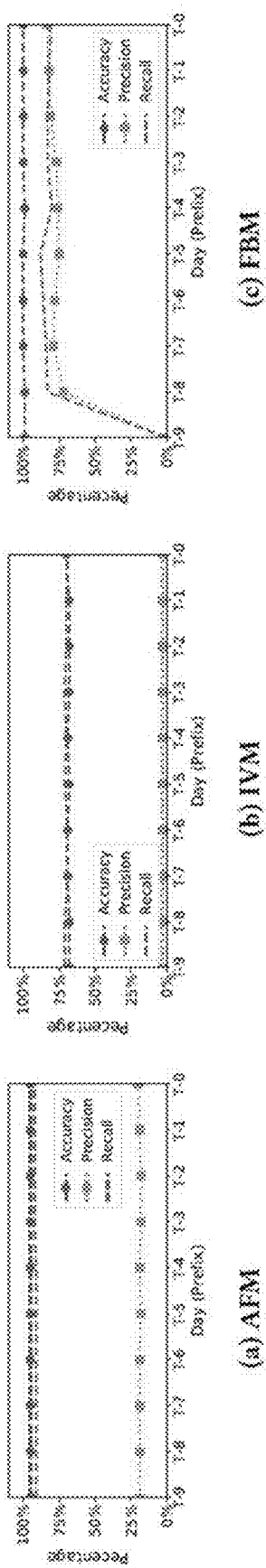
FIG. 2J illustrates a comparison of results for three different models in the feedback mode of FIG. 2G in accordance with various aspects described herein.

Performance of prediction models. FIG. 2J shows the accuracy, precision, and recall of AFM, IVM, and FBM models on 10 consecutive days (T 9 to T 0 on the x axis). The AFM model, FIG. 2J(a), has good accuracy and recall, but not good precision. The IVM model, FIG. 2J(b), underperforms on all three metrics, compared to AFM. The FBM model, FIG. 2J(c), outperforms the other two models in all three metrics. As discussed earlier, a key motivation for the design of FBM is to reduce the number of false positives. FIG. 2J(c) shows that the FBM model attains a threefold improvement in the precision metric, which is a measure of low false positives in the classification.

All three models were also compared using the AUROC metric. Again, FBM (AUROC 0.99) outperforms AFM (AUROC 0.95) and IVM (AUROC 0.77). It is noted that, notwithstanding the low precision, AFM has high accuracy and AUROC, due to the high imbalance of negative class labels in the input sets.

Figure 2K:
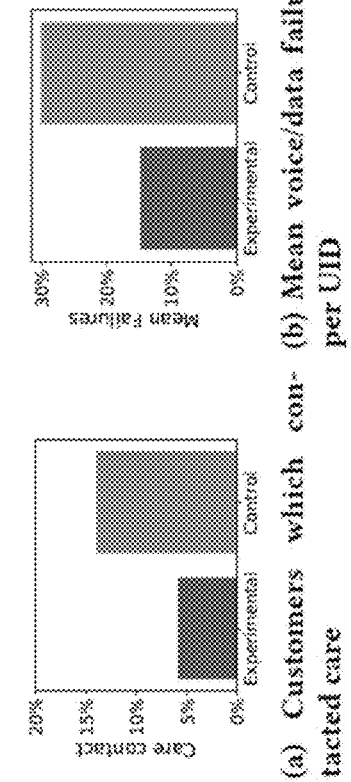
FIG. 2K illustrates results for the feedback model in accordance with various aspects described herein.

Consider now a closer look at the impact of the optional bias parameter on FBM performance. FIG. 2K(a) presents FBM results without the optional bias parameter for a set of 6 UIDs (denoted as "A", . . . , "E") for 7 consecutive days (T-7 through T-1). Predictions generated by FBM have low variance without the bias parameter $\beta$, which implies that input feature vectors (X) and (Z) cannot be clearly demarcated into two categories (True/False). Updating $\beta$ in Equation 5 enables the model to learn individual customer care contact behavior. During the first round of execution, the bias parameter $\beta$ is not available as there are no stored predictions from previous rounds, and therefore FBM generates an unusable prediction which is ignored (FIG. 2J(c)). FIG. 2K(b) shows the feature importance score for FBM. The FBM model learns from the results of the AFM, IVM, and the bias parameter $\beta$. The FBM model may be chosen for field deployment and trial experiments presented in below.

System runtime scalability. The system 230 needs to process and track each UID experiencing a failure event during time window |W|, which in some applications requires processing hundreds of billions of data records per day. This is infeasible even with a distributed deployment of the system 230. To avoid the overhead of tracking a massive volume of UIDs, in some embodiments, the system 230 creates a list of "Candidate UIDs" by sampling network logs 228 within a specific analysis window. The sampling of the network logs 228 may include undersampling. Recall from FIG. 2B(b) that nearly 75% of customers call care within 21 days of experiencing a failure. Therefore, the system 230 may sample 21 days of network logs 228 to ensure the candidate UID list contains at least 75% of customers that are likely to call care within next R time units. Additionally, as noted in above, customers who make a large number of voice calls are more likely to call care, and repeat callers contribute at least 28% of care center workload, as shown in FIG. 2B(a). Thus, the system 230 creates a candidate list by (a) sampling voice and data failure events in network logs 228 data, (b) sampling successful voice call records, and (c) using care logs 224 data for customers who have contacted care due to technical issues in the past 60 days. Table 5 shows the percentage of VCR/DCR records that the system 230 needs to process to achieve a given coverage, where the coverage (for a given |R|) is defined as $$\text{Coverage} = \frac{\text{UIDs with technical contact(s) in the candidate set}}{\text{UIDs with technical contact(s) (ground truth)}}$$

Although the percentages of UIDs sampled from each source are small, the system 230 needs several million UIDs to achieve a coverage of 16% to 23%.

TABLE 5

Coverage of different sampling ratios for NL.

| VCR events | DCR events | VCR volume | Coverage |
|---|---|---|---|
| ~0.4% | ~.012% | ~.01% | ~16% |
| ~0.4% | ~.012% | ~.04% | ~18% |
| ~0.4% | ~.024% | ~.01% | ~16% |
| ~1.2% | ~.012% | ~.01% | ~18% |
| ~1.2% | ~.024% | ~.1% | ~23% |
| ~4% | ~.012% | ~.01% | ~23% |

The exemplary test system 230 is fully automated and performs the entire workflow, from data analysis to triggering resolution actions, without human intervention. Assuming that the system 230 needs to analyze on average of approximately 2 million UIDs per day, the end-to-end time taken (analysis window size 21 days, |W|=6 days, and |R|=7 days) is a combination of time taken in (a) candidate set generation (approximately 20 mins), (b) data pre-processing (approximately 4 hours), (c) model scoring and predictions (approximately 45 mins), and (d) resolution action generation (approximately 2.8 ms per UID). The entire process consumes 76.1M GB-seconds and 2,200 k vcore-seconds of computing resources.

A test embodiment of the system 230 was deployed in a large cellular service provider net-work in the US with a goal to understand the overall efficacy of the system 230 and consider operation including the following: (1) How effective are the predictions and actions generated by the system 230 in resolving customer issues? (2) Did the actions triggered by the system 230 improve QoE for cellular customers? and (3) Is it feasible for a large cellular provider to deploy an automated framework to make online predictions and trigger resolution actions?

Field trial setup. A controlled field trial was launched in which a single instance of the system 230 was integrated into the production system of the cellular service provider. During this trial, the system 230 processes the network logs 228 data of over 100 million user mobile devices according to the procedure described for the online phase 234 in FIG. 2E using |W|=6 days and |R|=25 days, approximately 800,000 UIDs were sampled to be part of the experiment. These users were selected according to historical care logs 224 and network logs 228 data in the previous 28-day period. The system 230 is used to predict a short list of UIDs of customers who are likely to contact care due to service issues within the next 25 days. These UIDs were randomly split (predicted to contact care) into two groups: a control group and an experimental group. Since the goal here is to understand the efficacy of resolution actions generated by the system 230, only trigger resolution actions on UIDs in the experimental group and no resolution actions are triggered on UIDs in the control group. Note that the system 230 determines the actions to take based on domain knowledge and operational experiences provided by the cellular service provider.

Figure 2L:
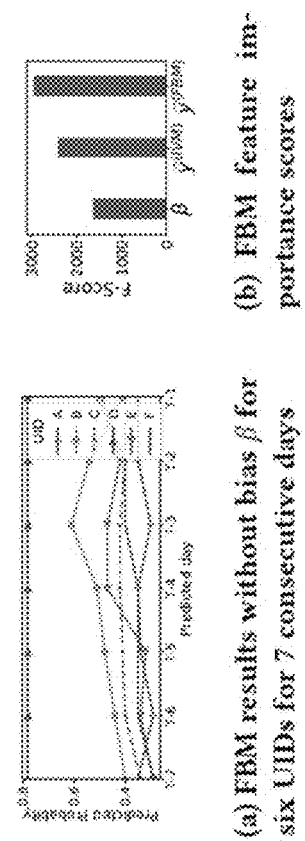
FIG. 2L compares results for an experimental group and a control group.

Experimental results. FIG. 2L compares results for an experimental group and a control group. FIG. 2L presents the results of a field trial. FIG. 2L(a) shows the percentage of customers in experimental and control groups who contacted care during the evaluation period. It may be observed that: (1) Nearly 15% of customers predicted to contact care by the system 230, indeed contacted care within 25 days after they experienced service issues, and (2) Resolution actions taken by the system 230 effectively reduced care contacts by 60% for customers in the experimental group, compared to customers in the control group. In order to understand the efficacy of the actions in improving customer QoE, the number of failures (data/voice) experienced by customers in the experimental and control groups are also compared. FIG. 2L(b) that resolution actions triggered by the system 230 effectively reduced the number of failures by 51% in the next 3 days after the action was taken.

During the field trial, it was observed that an embodiment of the system 230 was required to process up to 1.20 billion data records per hour during peak time. The embodiment of the system 230 consumed 6.3M GB-seconds and 297 k vcore-seconds of resources and took under 45 minutes to complete.

Analytical results. Since the field trial only involves a relatively small percentage of the entire customer base of the cellular service provider, a theoretical analysis of the controlled field trial results is presented here. Specifically, the hypothesis was tested that the distributions of the control and experimental groups were equal across the following two observed metrics for a period of 25 days after the resolution actions were taken: (1) the number of care contacts due to service issues, (2) the number of voice failures and data connectivity failures. Formally, given two populations P1 and P2 where |P1|=m and |P2|=n, one can validate the null hypothesis Ho P1=P2, and the alternate hypothesis, Hi P1 P2, where P1 and P2 represent the observations from the experimental and the control distributions, respectively. Due to the independent samples and non-normal distribution of the data, the Mann-Whitney U test may be used with p-value threshold a=0.05, to validate the null hypothesis.

It is found that for both cases (a) the number of care contacts due to service issues (U=21987.5, p-value=0.048), and (b) the number of voice failures and data connectivity failures (U=22545.5, p-value=0.028), the p-value is lower than a. Therefore the null hypothesis Ho can be rejected and the alternate hypothesis Hi can be accepted for both cases. That is, it may be concluded that the P1≠P2 for both (1) the number of care contacts due to service issues, and (2) the number of voice/data connectivity issues experienced by them.

Summary. The observed reduction in the number of failures along with the reduction in the number care contacts are very promising, yet these results are not exhaustive and more evaluation is required to better understand the efficacy of the predictions models. While it is infeasible to cover the entire customer base during the field trial, the embodiment of the system 306 has achieved significant improvements for individual customers' QoS and QoE, and done so without having the customer initiate a trouble report with care. This functionality can enable operators to move from a reactive to a proactive strategy when addressing customers with technical issues.

Predicting when a customer will contact care. In this paper, the problem of predicting the customers who will contact care (which can be modeled as a binary classification problem) has been considered in order to proactively take action for these customers. Due to missing data and lack of well-known indicators in the network logs dataset, current models do not currently predict when a customer is likely to contact care. Instead, UIDs experiencing failures during the prediction window are identified, and these UIDs are classified into customers who are likely or unlikely to contact care. While it is possible that a small percentage of customers contact care to report issues which are not observable from the network logs dataset, predicting the care contact behavior of such customers is not possible without access to rich behavioral features.

Conclusions. Cellular service carriers are constantly striving to improve the customer quality of experience. In this work, a fully automated framework is shown to enable carriers to shift from a reactive to a proactive customer care strategy for technical issues. Three machine learning-based are developed models, including a novel feedback model, to predict the customers who are likely to contact customer care, using a combination of customer and network data logs. Using predictions, individual customer technical issues (non-outage related) are resolved by proactively invoking resolution actions, which improves the customer quality of experience and reduces customer care contacts. These are demonstrated by large-scale trace-driven evaluation based on real world data collected from a major cellular service provider in the US, as well as by field trial experiments after deploying an embodiment of the system into the cellular service provider's network.

Figure 2M:
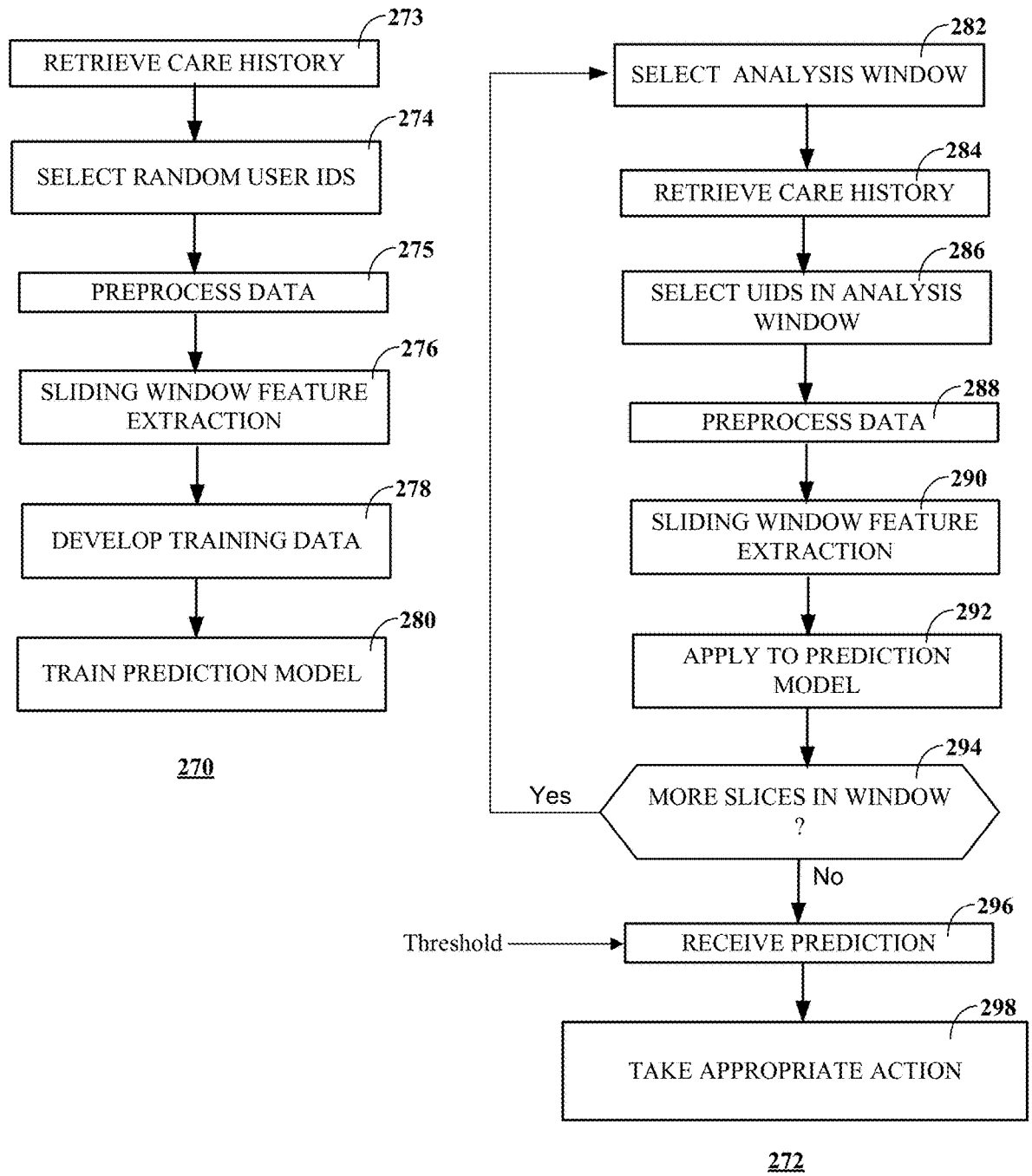
FIG. 2M depicts an illustrative embodiment of a method in accordance with various aspects described herein.

FIG. 2M depicts an illustrative embodiment of an offline method 270 and an online method 272 in accordance with various aspects described herein. The offline method 270 illustrates one exemplary embodiment of an offline method for training a machine learning model for identifying communication service customers most likely to call customer care. The online method 272 illustrates one exemplary embodiment of an online method for using a machine learning model for identifying communication service customers most likely to call customer care and acting to prevent the need for the customer to call care.

The offline method 270 begins with an operation of retrieving care history, step 273. The care history may include any useful information about calls to customer care by users or subscribers to the communication service provided by a communication service provider or network operator. For example, as shown in the example of FIG. 2E, the care history retrieved at step 273 may include call logs 224, customer account information 226 and network logs 228 (FIG. 2E). Some or all of this information may be retrieved. The retrieved information may include current information or historical information collected over a particular time frame such as one week, one month, or other.

At step 274, the offline method 270 selects one or more random user identifiers (User IDs) and retrieves network interaction history information for the customers associated with the random User IDs. The random user IDs retrieved at step 274 and the care history retrieved at step 273 may be combined at preprocessing step 275. Any other suitable data manipulation may be performed at preprocessing step 275. The result of preprocessing step 275 is to develop for each customer a service signature. The combination of care logs 224, the customer account information 226 and the network logs 228, for each respective customer, may be considered that customer's service signature.

At step 276, a sliding window feature extraction process is performed. This may be as illustrated in FIG. 2F, for example. Preprocessed data from preprocessing step 275 may be segmented in time according to a sequence of time slots. In the illustrated example of FIG. 2F, ten time slots of the preprocessed data is divided into three slices of 9 time slots each. A first slice has time slots T-2 through T-9 with time slot T-2 corresponding to the predicted period. A second slice includes time slots T-1 to T-8, with time slot T-1 corresponding to the predicted period. A third slice includes time slots t-0 through T-7, with time slot T-0 corresponding to the predicted period. The first slice, the second slice and the third slice together form feature vectors of training data. The training data is the result of the feature extraction process of step 276.

At step 278, training data is developed for the prediction model and at step 280, the prediction model is trained using the training data. In general, the care history retrieved at step 273 may include a substantial amount of data. Accordingly, the offline process may be performed relatively infrequently, such as one per month. In alternative embodiments, the process of offline method 270 and online method 272 may be distributed over a number of data centers. In such an embodiment, there will be less data to process and the offline method 270 may be performed more frequently, such as weekly.

The online method 272 illustrates one exemplary embodiment of an online method for using a machine learning model for identifying communication service customers most likely to call customer care. The online method 272 may be performed at any suitable frequency, such as daily. In some embodiments, the method uses a different sliding window to identify customers most likely to call care. For example, an embodiment uses |R| time units, where IR I={T–0, T+1,T+2, T+3, T+4}. Any suitable window of time units could be used instead. In an example, each time unit is one day, but any suitable value may be used.

At step 284, a care history for the current analysis window is retrieved. In one example, the analysis window is a time duration of one day and the care history includes all calls to customer care during the current day. At step 286, User IDs in the analysis window are selected. The online method 272 needs to process and track each User ID experiencing a failure event during each time window being analyzed. To avoid the overhead of tracking a large number of User IDs, the online method 272 creates a list of Candidate User IDs at step 286 by under-sampling network logs within a specific analysis window. In one example, the online method 272 creates a candidate list by (a) sampling voice and data failure events in network log data, (b) sampling successful voice call records, and (c) using care log data for customers who have contacted care due to technical issues in the past 60 days. The candidate list is preprocessed at step 288 and at step 290, a sliding window feature extraction is performed, as illustrated for example in FIG. 2F. The slices of the sliding window in online method 272 may include uses |R| time units as noted above.

At step 292, the feature vectors for the current time slice are applied to the prediction model developed with the training data in offline method 270. At step 294, if there are more time slices to process, control returns to step 282 to select a next analysis window. If there are no further slices to process, at step 296, the prediction is generated. In one example, the prediction includes a list of phone numbers or other identifiers of individual customers likely to call customer care. In another example, the prediction is a probability that a selected customer is likely to call customer care. The probability may have a value between [0. 1]. The probability may be compared with a threshold, such as 0.50 or 0.90, received at step 296. The value of the threshold may be set by the operator of the communication network and may be static or dynamically adjusted, for example.

At step 298, appropriate action is taken to prevent the customer from having to call customer care. For example, the device such as a cellular telephone of the customer may be subject to a network reset to proactively correct existing network issues and to reduce the probability that the individual customer will contact care regarding individual service issues.

By anticipating potential service issues for individual customers in this manner, the quality of experience (QoE) for individual customers is enhanced, increasing the customer's satisfaction with the service provided. Moreover, the operational efficiency of the network operator is enhanced by reducing the number of customer care contacts that must occur, along with the required subsequent investigation and mitigation processes. The amount of traffic and messaging in the network required to manage a customer issue is reduced or eliminated by reducing or eliminating a substantial portion of customer care issues. If an individual customer is predicted by the disclosed system and method to have an issue and to call customer care, action may be taken to resolve the issue. This reduces the severity and degradation of customer quality of experience and eliminates the need for the customer to contact care.

While for purposes of simplicity of explanation, the respective processes are shown and described as a series of blocks in FIG. 2M, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram is shown illustrating an example, non-limiting embodiment of a virtualized communication network 300 in accordance with various aspects described herein. In particular a virtualized communication network is presented that can be used to implement some or all of the subsystems and functions of communication network 100, the subsystems and functions of system 230, offline method 270, and online method 272 presented in FIGS. 1, 2A, 2E, 2F, 2G and 3. For example, virtualized communication network 300 can facilitate in whole or in part collecting network log information about usage of all or a part of virtualized communications network 400 and care log information about customer interactions with customer care representatives about device and performance issues in the virtualized communication network 300, determining a likelihood that any one individual customer will contact customer care about an issue, and addressing the potential issue before the issue occurs and the individual customer contacts customer care.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
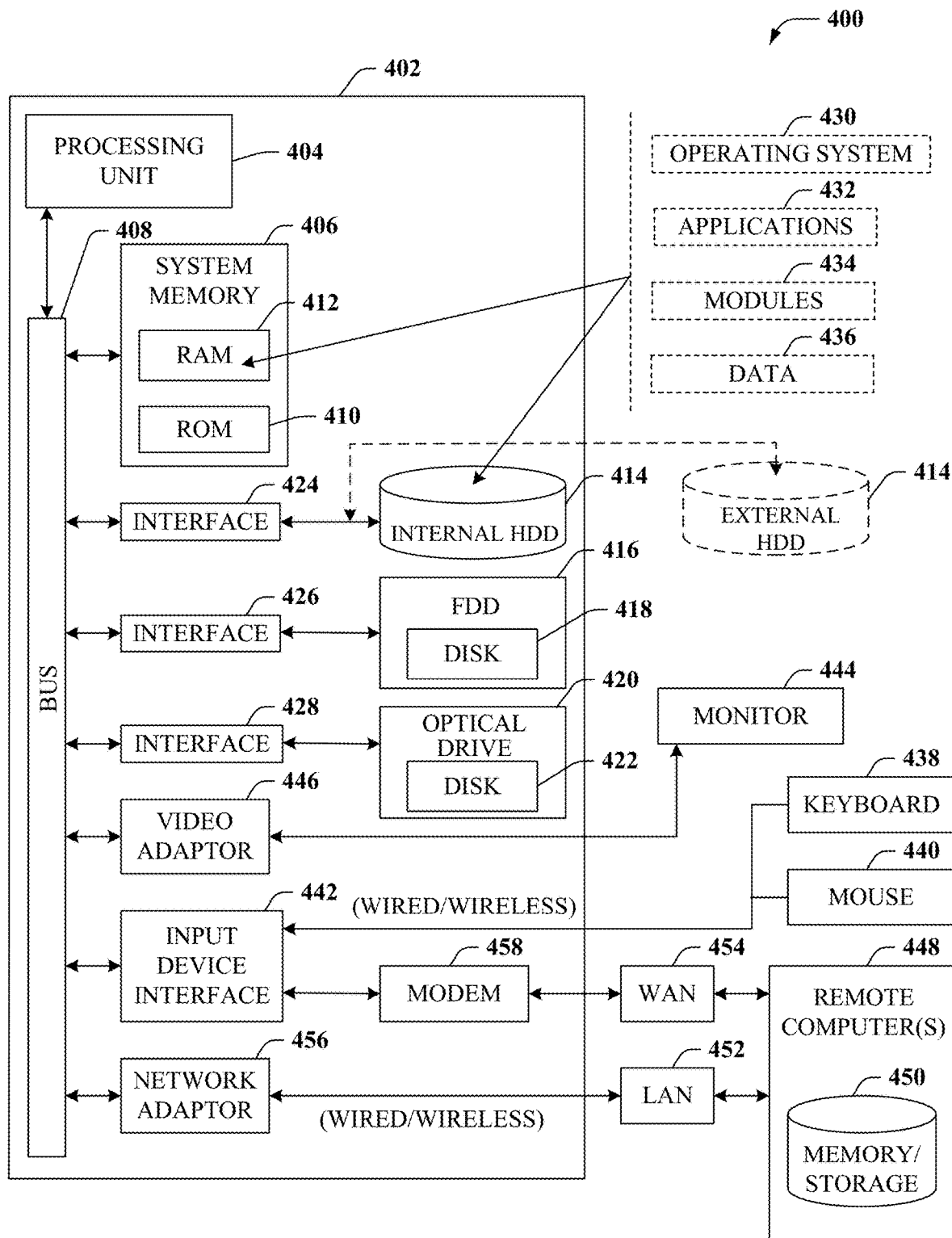
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part collecting network log information about usage of all or a part of communications network incorporating computing environment 400 and care log information about customer interactions with customer care representatives about device and performance issues in a communications network, determining a likelihood that any one individual customer will contact customer care about an issue, and addressing the potential issue before the issue occurs and the individual customer contacts customer care.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/ or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
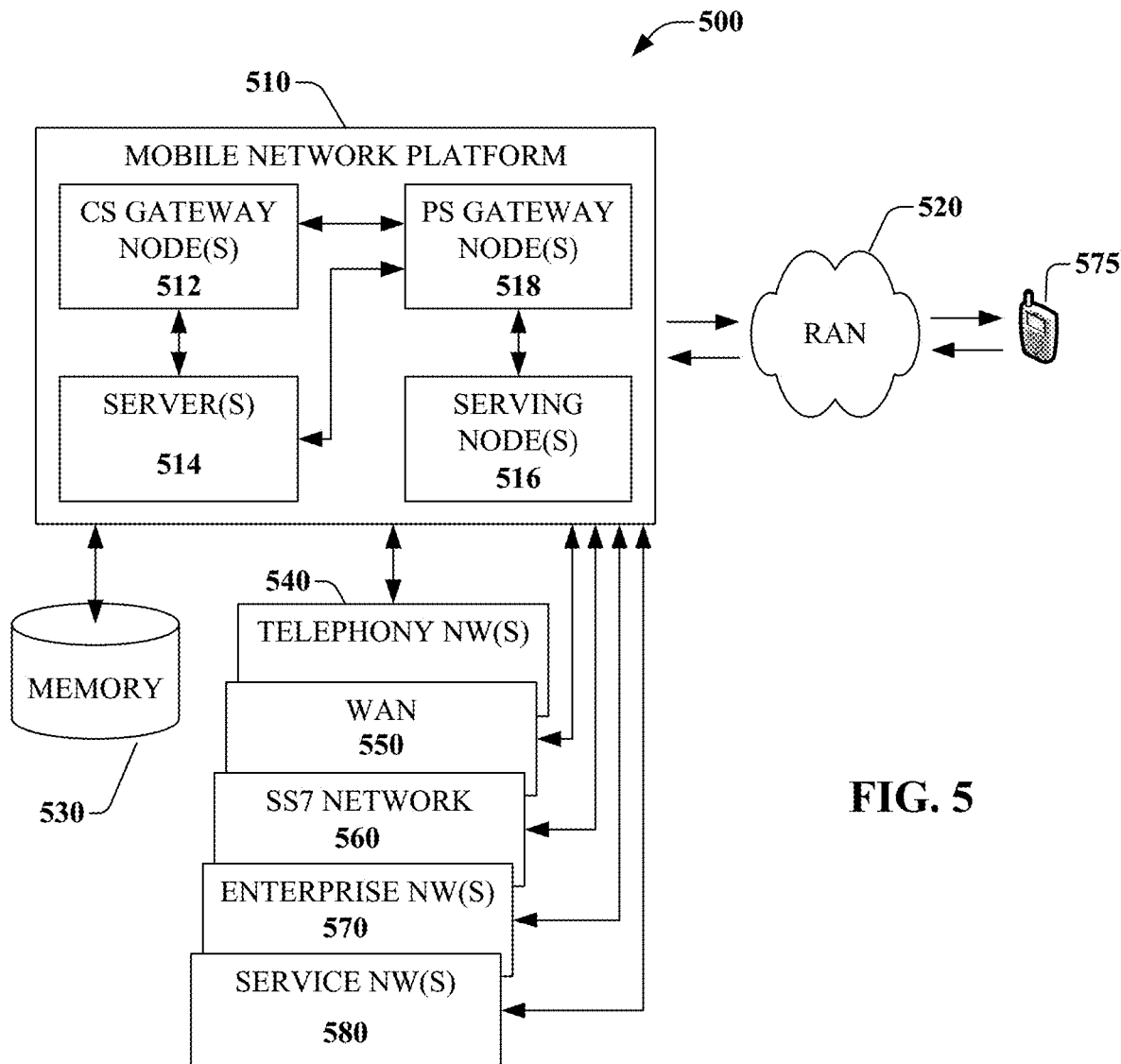
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part collecting network log information about usage of all or a part of a mobile communications network and care log information about customer interactions with customer care representatives about device and performance issues in the mobile network, determining a likelihood that any one individual customer will contact customer care about an issue, and addressing the potential issue before the issue occurs and the individual customer contacts customer care. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technologies utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
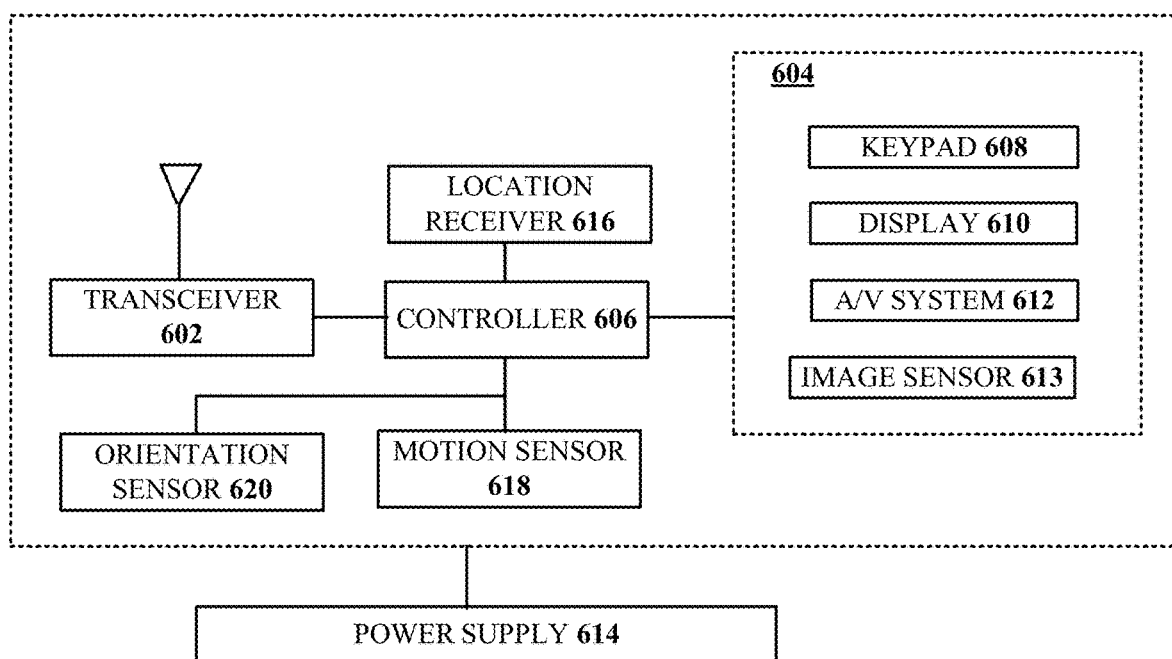
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part collecting network log information about usage of all or a part of communications network including one or more computing devices such as computing device 600 and care log information about customer interactions with customer care representatives about device and performance issues in the communications network, determining a likelihood that any one individual customer will contact customer care about an issue, and addressing the potential issue before the issue occurs and the individual customer contacts customer care.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x)= confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
retrieving historical voice call information and historical data call information for a plurality of customers, including a selected customer, of a communication service provider, wherein the historical voice call information and historical data call information comprises information about network access by the plurality of customers to a communication network of the communication service provider;
training a machine learning model using training data based on the historical voice call information and the historical data call information,
wherein the training the machine learning model comprises defining, using a sliding window, a plurality of slices, each respective slice of the plurality of slices segmented to include a plurality of time units, each respective time unit including associated historical voice call information and associated historical data call information,
wherein at least some respective time units of the respective slices of the plurality of slices overlap in time to reuse the associated historical voice call information and associated historical data call information to form the training data for the machine learning model;
applying current voice call information for the selected customer and current data call information for the selected customer to the machine learning model to determine a likelihood that the selected customer will require customer care assistance by the communication service provider; and
responsive to the likelihood that the selected customer will require customer care assistance exceeding a predetermined threshold, initiating a corrective action on the communication network of the communication service provider to reduce the likelihood that the selected customer will require customer care assistance.

2. The device of claim 1, wherein the operations further comprise:
   identifying a customer device used by the selected customer to access the communication network of the communication service provider; and
   initiating, by the communication network, a cancelation of a registration of the customer device with the communication network as a correction action.

3. The device of claim 1, wherein the operations further comprise:
   applying a sliding window feature extraction process to the historical voice call information and the historical data call information to remove seasonality effects in the historical voice call information and the historical data call information.

4. The device of claim 3, wherein the operations further comprise:
   applying a second sliding window feature extraction process to the current voice call information and the current data call information before applying the current voice call information and the current data call information to the machine learning model, wherein the second sliding window feature extraction process differs from the sliding window feature extraction process.

5. The device of claim 1, wherein retrieving the historical voice call information and the historical data call information comprises retrieving a care log dataset and retrieving a network log dataset, wherein retrieving a care log dataset comprises receiving information about a plurality of customer care calls including information about a customer associated with a respective customer care call, information about a customer care issue associated with the respective customer care call and information about actions taken for resolving the customer care issue associated with the respective customer care call, and wherein retrieving a network log dataset comprises receiving information about a plurality of data communication sessions including information about a customer associated with a respective data communication session and information about a cause of termination of the respective data communication session.

6. The device of claim 1, wherein the operations further comprise applying the current voice call information for the selected customer and current data call information for the selected customer to an aggregated features model (AFM) to determine a first likelihood that the selected customer will require customer care assistance.

7. The device of claim 6, wherein the operations further comprise applying the current voice call information for the selected customer and current data call information for the selected customer to an individual variations model (IVM) to determine a second likelihood that the selected customer will require customer care assistance.

8. The device of claim 7, wherein the operations further comprise:
   applying the first likelihood that the selected customer will require customer care assistance and the second likelihood that the selected customer will require customer care assistance to a feedback model (FBM); and
   receiving from the feedback model a value corresponding to the likelihood that the selected customer will require customer care assistance.

9. The device of claim 1, wherein the device comprises one device of a plurality of similar devices, each respective device of the plurality of similar devices is dedicated to a respective unique portion of the communication network of the communication service provider.

10. The device of claim 1, wherein the operations further comprise:
    extracting feature vectors from the historical voice call information and historical data call information.

11. A non-transitory computer-readable medium, comprising executable instructions that, when executed by a processing system including a processor, facilitate performance of operations, the operations comprising:
    receiving care log information and network log information about communications between a communication network of a communication service provider and a plurality of customers of the communication service provider;
    extracting feature vectors from the care log information and the network log information including defining, using a sliding window, a plurality of slices, each respective slice of the plurality of slices segmented to include a plurality of time units, each respective time unit including associated care log information and associated network log information,
    wherein at least some respective time units of the respective slices of the plurality of slices overlap in time to reuse the associated care log information and the associated network log information to form the feature vectors;
    training a machine learning model using the feature vectors;
    providing current call information to the machine learning model, wherein the providing current call information comprises providing information about current calls for a selected customer of the plurality of customers, wherein the information about current calls comprises current voice call information for the selected customer and current data call information for the selected customer for an analysis window;
    receiving, from the machine learning model, information about a likelihood that the selected customer will require customer care assistance by the communication service provider; and
    responsive to the likelihood that the selected customer will require customer care assistance exceeding a predetermined threshold, initiating a corrective action on the communication network of the communication service provider to reduce the likelihood that the selected customer will require customer care assistance.

12. The non-transitory, computer-readable medium of claim 11, wherein the operations further comprise:
    receiving, from the machine learning model, information about a likelihood that a plurality of customers, including the selected customer, will require customer care assistance; and
    based on the likelihood that the plurality of customers will require customer care assistance, providing a list of telephone numbers, including a telephone number of the selected customer.

13. The non-transitory, computer-readable medium of claim 12, wherein the operations further comprise . . .
    based on the telephone number of the selected customer, identifying a customer device used by the selected customer to access the communication network of the communication service provider; and
    initiating, by the communication network, a registration cancelation of the customer device and the communication network as a correction action.

14. The non-transitory, computer-readable medium of claim 11, wherein extracting feature vectors from the care log information and the network log information comprises:

performing a sliding window feature extraction operation on the care log information and the network log information to develop a prediction for a designated time period.

15. The non-transitory, computer-readable medium of claim 14, wherein the operations further comprise:
providing the current call information for the selected customer to a second sliding window feature extraction operation.

16. The non-transitory, computer-readable medium of claim 11, wherein the operations further comprise:
providing the current call information for the selected customer of the plurality of customers a first model to generate a first probability, wherein the first model aggregates features of the current call information;
providing the current call information for the selected customer of the plurality of customers to a second model to generate a second probability, wherein the second model averages usage of the communication network of the communication service provider by the selected customer; and
combining the first probability and the second probability to produce the information about a likelihood that the selected customer will require customer care assistance.

17. A method, comprising:
automatically detecting, by a processing system including a processor, a service issue of a telecommunication system that may impact a customer of a telecommunication service provider of the telecommunication system;
training, by the processing system, a machine learning model using training data, the training data formed by defining, using a sliding window, a plurality of slices, each respective slice of the plurality of slices segmented to include a plurality of time units, each respective time unit including associated historical voice call information and associated historical data call information of the telecommunication system,
wherein at least some respective time units of the respective slices of the plurality of slices overlap in time to reuse the associated historical voice call information and associated historical data call information to form the training data for training the machine learning model predicting, by the processing system implementing the machine learning model, a future customer care interaction by the customer as a result of the service issue;
initiating, by the processing system, a resolution action of the telecommunication system for the service issue before the customer contacts a customer care agent of the telecommunication service provider, wherein the initiating is responsive to the predicting the future customer care interaction; and
modifying a component of the telecommunication system to improve efficiency of operation of the telecommunication system by reducing a number of customer care contacts by customers of the telecommunication service provider.

18. The method of claim 17, further comprising:
retrieving, by the processing system, historical data about operation of the telecommunication system, the historical data comprising the associated historical voice call information and the associated historical data call information;
extracting, by the processing system, feature data from the historical data to generate feature vectors; and
training, by the processing system, the machine learning model using the feature vectors.

19. The method of claim 18, wherein the predicting a further customer care interaction comprises:
determining, by the processing system, a likelihood that the customer will initiate the future customer care interaction using the machine learning model.

20. The method of claim 18, wherein the retrieving historical data about operation of the telecommunication system comprises:
receiving, by the processing system, information about a plurality of customer care calls including information about a customer associated with a respective customer care call, information about a customer care issue associated with the respective customer care call and information about actions taken for resolving the customer care issue associated with the respective customer care call; and
receiving, by the processing system, information about a plurality of data communication sessions including information about a customer associated with a respective data communication session and information about a cause of termination of the respective data communication session.

* * * * *